United States Patent
Hoffmann

(10) Patent No.: US 11,670,894 B2
(45) Date of Patent: Jun. 6, 2023

(54) METHOD AND SYSTEM FOR ERROR CORRECTION IN AUTOMATED WIRE CONTACT INSERTION WITHIN A CONNECTOR

(71) Applicant: The Boeing Company, Chicago, IL (US)

(72) Inventor: Heiko Hoffmann, Malibu, CA (US)

(73) Assignee: THE BOEING COMPANY, Chicago, IL (US)

( * ) Notice: Subject to any disclaimer, the term of this patent is extended or adjusted under 35 U.S.C. 154(b) by 248 days.

(21) Appl. No.: 16/906,536

(22) Filed: Jun. 19, 2020

(65) Prior Publication Data

US 2021/0399470 A1    Dec. 23, 2021

(51) Int. Cl.
*B25J 19/02*    (2006.01)
*B25J 9/16*    (2006.01)
(Continued)

(52) U.S. Cl.
CPC .......... *H01R 13/641* (2013.01); *B25J 9/1633* (2013.01); *B25J 9/1687* (2013.01);
(Continued)

(58) Field of Classification Search
CPC ...... H01R 13/641; H01R 43/20; B25J 9/1633; B25J 9/1687; B25J 9/1697; B25J 19/023;
(Continued)

(56) References Cited

U.S. PATENT DOCUMENTS

| | | | |
|---|---|---|---|
| 4,567,610 A | | 1/1986 | McConnell |
| 4,787,138 A | * | 11/1988 | Eaton ................ H01R 43/20 29/748 |

(Continued)

FOREIGN PATENT DOCUMENTS

| | | |
|---|---|---|
| EP | 0182951 A2 | 5/1986 |
| EP | 2783802 A2 | 10/2014 |

(Continued)

OTHER PUBLICATIONS

European Application No. 20186225.7, Extended European Search Report dated Jan. 13, 2021.

(Continued)

*Primary Examiner* — Abby Y Lin
*Assistant Examiner* — Dylan M Katz
(74) *Attorney, Agent, or Firm* — Alston & Bird LLP

(57) ABSTRACT

A method, system and computer program product are provided for correction of automated insertion of a wire contact into a target hole of a connector. Methods include controlling a robot having an end-effector to: align the wire contact with the target hole of the connector; advance the wire contact toward and into the target hole of the connector; cease insertion in response to a force between the wire contact and the connector exceeding a predefined value; determine a depth of insertion; in response to the depth of insertion being above a predefined depth, perform a pull test on the inserted wire contact; in response to the depth of insertion being below a predetermined depth, identify an error condition using visual feedback; determine a number of corrective operations performed and perform error correction if the number is below a predefined number, while withdrawing the wire contact otherwise.

19 Claims, 18 Drawing Sheets

(51) Int. Cl.
H01R 13/641 (2006.01)
G06T 7/70 (2017.01)
(52) U.S. Cl.
CPC ........... B25J 9/1697 (2013.01); B25J 19/023 (2013.01); G06T 7/70 (2017.01)
(58) Field of Classification Search
CPC .. B25J 11/00; G06T 7/70; G06T 2207/10024; G06T 2207/30164; G06T 7/001; G06T 7/73; G05B 2219/39506; G05B 2219/40055
See application file for complete search history.

(56) References Cited

U.S. PATENT DOCUMENTS

| | | | |
|---|---|---|---|
| 5,537,741 A * | 7/1996 | Peterson | G05B 19/4182 29/748 |
| 5,737,500 A * | 4/1998 | Seraji | B25J 9/1643 700/262 |
| 6,711,293 B1 | 3/2004 | Lowe | |
| 8,494,304 B2 | 7/2013 | Venable et al. | |
| 8,670,619 B2 | 3/2014 | Funayama et al. | |
| 9,555,549 B2 * | 1/2017 | Motoyoshi | B25J 9/1687 |
| 10,288,410 B2 | 5/2019 | Hoffmann | |
| 2005/0254699 A1 | 11/2005 | Sano et al. | |
| 2007/0019868 A1 | 1/2007 | Takai et al. | |
| 2015/0120047 A1 | 4/2015 | Motoyoshi et al. | |
| 2017/0151673 A1 | 6/2017 | Kobayashi et al. | |
| 2017/0160077 A1 | 6/2017 | Featherstone et al. | |
| 2017/0243357 A1 | 8/2017 | Peng et al. | |
| 2017/0320213 A1 * | 11/2017 | Helmick | H01R 43/005 |
| 2018/0108458 A1 | 4/2018 | Maki et al. | |
| 2018/0130218 A1 | 5/2018 | Hoffman | |
| 2020/0180157 A1 * | 6/2020 | Ueda | B25J 9/1633 |
| 2020/0346349 A1 * | 11/2020 | Chung | B25J 9/161 |

FOREIGN PATENT DOCUMENTS

| | | |
|---|---|---|
| JP | H05-62757 A | 3/1993 |
| JP | 2004-119046 A | 4/2004 |
| JP | 2016-058320 A | 4/2016 |
| WO | WO 2015/156793 A1 | 10/2015 |

OTHER PUBLICATIONS

European Application No. 20186226.5, Extended European Search Report dated Jan. 14, 2021.
Borgefors, Gunilla, "Distance transformations in digital images," Comput. Vision Graph. Image Process., 34(3): 344-371, (1986).
Canny, John, "A Computational Approach to Edge Detection," IEEE Trans. Pattern Analysis and Machine Intelligence, 8(6):679-698, (1986).
Choe et al., "Vision-based estimation of bolt-hole location using circular hough transform," ICCAS-SICE 2009—ICROS-SICE International Joint Conference 2009, Proceedings, pp. 4821-4826, (2009).
Davies, E.R et al., "An Analysis of Hole Detection Schemes," Proc. British Machine Vision Assoc. Conf., Oxford (Sep. 24-27), pp. 285-290, (1990).
Duda, R.O. et al., "Use of Hough transformation to detect lines and curves in pictures," Comm. ACM, 15(1): 11-15, (1972).
"Eroding and Dialating," OpenCV Tutorials, (2019). [<URL: https://docs.opencv.org/2.4/doc/tutorials/imgproc/erosion_dilatation/erosion_dilatation.html>].
"Feature Matching + Homography to find Objects," OpenCV-Python Tutorials, (2013). [<URL: https://opencv-python-tutroals.readthedocs.io/en/latest/py_tutorials/py_feature_homography.html#feature-homography>].
Fitzgibbon, Andrew W. et al., "A Buyer's Guide to Conic Fitting," Proc. 5th British Machine Vision Conference, Birmingham, pp. 513-522, (1995).

Girshick, Ross, "FastR-CNN" (PDF), In proceedings of the 2015 IEEE International Conference on Computer Vision (ICCV) (ICCV '15), (IEEE Computer Society, Washington, DC, USA), 1440-1448, (2015).
Girshick, Ross, et al., "Rich Feature Hierarchies for Accurate Object Detection and Semantic Segmentation," In Proceedings of the 2014 IEEE Conference on Computer Vision and Pattern Recognition (CVPR '14). (IEEE Computer Society, Washington, DC, USA), 580-587, (2014).
Hu, "Visual Pattern Recognition by Moment Invariants," IRE Transactions on Information Theory, 8(2):179-187, (1962).
Komax Zeta Wire Bundle Assembly Machine, Zeta 640/650 Harness Manufacturing, Komax Group, 12 pages.
Laursen, J.S. et al., "Automatic error recovery in robot assembly operations using reverse execution," 2015 IEEE/RSJ International Conference on Intelligent Robots and Systems (IROS), Hamburg, pp. 1785-1792, (2015).
Liao, S. et al., "Learning Multi-Scale Block Local Binary Patterns for Face Recognition," International Conference on Biometrics (ICB), pp. 828-837, (2007).
Lienhart, R. et al., "An Extended Set of Haar-like Features for Rapid Object Detection," IEEE ICIP, pp. I-900-I-903, (2002).
Lindberg, T., "Detecting Salient Blob-Like Image Structures and Their Scales with a Scale-Space Primal Sketch: A Method for Focus-of-Attention," International Journal of Computer Vision, 11(3):283-318, (1993).
Liu, W. et al., "SSD: Single shot multibox detector," In European conference on computer vision, 21-37, (2016).
Loborg, P., "Error Recovery in Automation—An Overview," AAAI Technical Report SS-94-04, pp. 94-100, (1994).
Lowe, D., "Distinctive Image Features from Scale-Invariant Keypoints," Int. J. Computer Vision, 60(2):91-110, (2004).
Meyer, F., "Color Image Segmentation," In IEEE Fourth International Conference on Image Processing and its Applications, pp. 303-306, (1992).
Office Action for U.S. Appl. No. 16/536,622 dated Jun. 29, 2020, 9 pages.
Penate-Sanchez, A. et al., "Exhaustive Linearlization for Robust Camera Pose and Focal Length Estimation," In IEEE Trans. on Pattern Analysis and Machine Intelligence, pp. 1-14, (2013).
Press, W. H., et al., "Minimization or Maximization of Functions [excerpt]," Numerical Recipes in C: The Art of Scientific Computing, Cambridge University Press, UK, pp. 412-420, (1993).
Redmon, J. et al., "You Only Look Once: Unified, Real-Time Object Detection," 2016 IEEE Conference on Computer Vision and Pattern Recognition (CVPR), Las Vegas, NV, pp. 779-788, (2016).
Shi and Tomasi, "Good Features to Track," Proceedings of the IEEE Conference on Computer Vision and Pattern Recognition, pp. 593-600, (Jun. 1994).
Sklansky, Jack, "Finding the Convex Hull of a Simple Polygon," Pattern Recognition Letters, 1(2): 79-83, (1982).
Song, H. et al., "USB assembly strategy based on visual servoing and impedance control," 2015 12th International Conference on Ubiquitous Robots and Ambient Intelligence (URAI), Goyang, pp. 114-117, (2015).
Suárez-Ruiz et al., "A Framework for Fine Robotic Assembly," arXiv, (2015), [<URL:https://arxiv.org/abs/1509.04806>].
Suzuki, S. et al., "Topological Structural Analysis of Digitized Binary Images by Border Following," CVGIP, 30(1):32-46, (1985).
Tipping, M.E. et al., "Mixtures of probabilistic principal component analyzers," Neural Computation, 11:443-482, (1999).
Viola, P., et al. "Rapid Object Detection using a Boosted Cascade of Simple Features," Computer Vision and Pattern Recognition (CVPR), pp. 511-518, (2001).
Viola, P., et al., "Robust real-time face detection," International Journal of Computer Vision, 57(2):137-154, (2004).
U.S. Appl. No. 16/536,598, filed Aug. 9, 2019.
U.S. Appl. No. 16/536,622, filed Aug. 9, 2019.
U.S. Appl. No. 16/906,622, filed Jun. 19, 2020.
Yuen, H.K. et al., "A Comparative Study of Hough Transform Methods for Circle Finding," Image Vision Comput., 8(1):71-77, (1990).

(56) References Cited

OTHER PUBLICATIONS

Final Office Action for U.S. Appl. No. 16/536,622 dated Oct. 2, 2020.

* cited by examiner

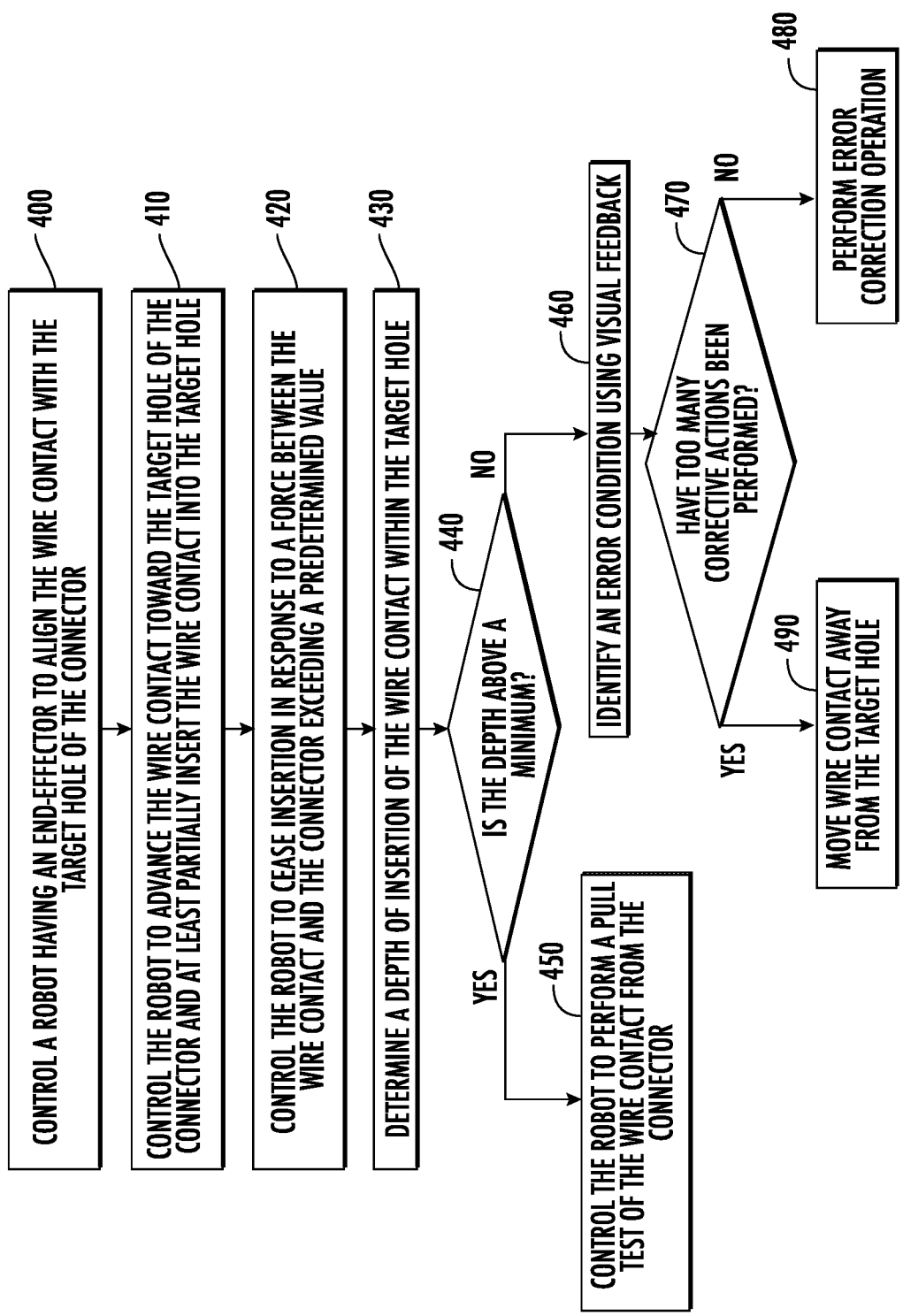

METHOD AND SYSTEM FOR ERROR CORRECTION IN AUTOMATED WIRE CONTACT INSERTION WITHIN A CONNECTOR

TECHNICAL FIELD

A method, system and computer program product are provided in accordance with an example embodiment in order for automated alignment of wire contacts with insertion holes of a connector and to provide error correction thereof, and more particularly, to provide correction of improperly inserted wire contacts during automated contact insertion into connectors.

BACKGROUND

Wire bundles consisting of a plurality of wires are utilized in a variety of industries to carry a myriad of different types of signals. The wire of a wire bundle assembly must frequently be terminated with a wire contact and the resulting wire end is inserted into a wire contact insertion hole of a connector, such as in a rubber grommet of a connector. As each wire of a wire bundle is unique and may carry a different type of signal, the wire ends of a wire bundle assembly must be inserted into specific wire contact insertion holes of a connector in order to make the proper connections.

The wire ends of a wire bundle assembly may be manually inserted into the respective wire contact insertion holes defined by a connector. As wire bundle assemblies commonly include dozens or possibly hundreds of wires, this manual connection process may be relatively time consuming and error prone and, as a result, may increase the cost of the overall assembly including the wire bundle assembly. As such, automated techniques to insert the wire ends of a wire bundle assembly into the wire contact insertion holes of a connector have been developed in an effort to reduce the time expended to make the connections and to correspondingly reduce the cost of the resulting assembly. However, wire bundle assembly machines generally require the connectors to be in a very restricted and controlled set of locations in order to increase the likelihood that the wire ends of the wire bundle assembly may be properly inserted into the wire contact insertion holes of the connector. As such, wire bundle assembly machines limit the flexibility with which connectors may be presented and, as such, are not suitable for all scenarios. Further, automated wire insertion techniques may improperly insert wire contacts into a connector, thereby halting the automated process and requiring correction.

BRIEF SUMMARY

A method, system and computer program product are provided for automated alignment of wire contacts with insertion holes of a connector and to provide error correction thereof, and more particularly, to provide correction of improperly inserted wire contacts during automated contact insertion into connectors. Embodiments include a system for correction of automated insertion of a wire contact into a target hole of a connector, the system including: a robot having an end-effector, where the end-effector includes a wire gripper; a computing device, where the computing device is configured to: control the robot to align the wire contact with the target hole of the connector; control the robot to advance the wire contact toward the target hole of the connector and at least partially insert the wire contact into the target hole; control the robot to cease insertion in response to a force between the wire contact and the connector exceeding a predefined value; determine a depth of insertion of the wire contact within the target hole of the connector; in response to the depth of insertion being above a predetermined depth, control the robot to perform a pull test of pulling the wire contact away from the connector; in response to the depth of insertion being below a predetermined depth: identify an error condition using visual feedback; determine a number of corrective operations performed; perform an error correction operation in response to the number of corrective operations being below a predefined number; and move the wire contact away from the target hole in response to the number of corrective operations being above the predefined number.

According to some embodiments, the computing device configured to perform an error correction operation includes the computing device configured to: control the robot to adjust an orientation of the wire contact to be oriented perpendicular to a front surface of the connector; and control the robot to re-insert the wire contact into the target hole of the connector. The computing device configured to adjust an orientation of the wire contact to be oriented perpendicular to a front surface of the connector, according to some embodiments, includes a computing device configured to: determine an orientation of the wire contact relative to the connector; project the orientation of the wire contact onto a plane perpendicular to an orientation of the wire gripper to identify a resulting vector; and control the robot to adjust the orientation of the wire contact according to the resulting vector to be oriented perpendicular to a front surface of the connector. According to some embodiments, the computing device configured to adjust an orientation of the wire contact to be oriented perpendicular to a front surface of the connector includes a computing device configured to: determine an orientation of the wire contact relative to the connector; project the orientation of the wire contact onto a plane perpendicular to an orientation of the wire gripper to identify a resulting vector; increase the resulting vector by a predetermined amount; and control the robot to adjust the orientation of the wire contact according to the increased resulting vector to be oriented perpendicular to a front surface of the connector.

The computing device configured to move the wire contact away from the target hole, according to some embodiments, includes the computing device configured to: control the robot to re-align the wire contact with the target hole; control the robot to advance the wire contact toward the target hole of the connector and at least partially insert the wire contact into the target hole; control the robot to cease insertion in response to a force between the wire contact and the connector exceeding a predefined value; determine a depth of insertion of the wire contact within the target hole of the connector; in response to the depth of insertion being above a predetermined depth, control the robot to perform a pull test of pulling the wire contact away from the connector; and provide for indication of successful insertion of the wire contact into the target hole of the connector in response to the pull test satisfying predetermined criteria. The predetermined criteria of some embodiments includes movement of the wire contact less than a predefined amount out of the target hole in response to a pull force applied to the wire contact of at least a predetermined force.

According to an example embodiment, the end effector includes one or more image acquisition devices for capturing images of the wire contact and the connector from at least two different angles. The computing device of an example embodiment configured to control the robot to align the wire contact with the target hole of the connector includes the computing device configured to: acquire images from at least two different angles using the one or more image acquisition devices; identify a location of the target hole; identify an alignment direction to align the wire contact with the target hole of the connector; and control the robot to move the wire contact in the alignment direction in a plane orthogonal to an axis along which the wire contact extends. The depth of insertion of the wire contact is determined, according to some embodiments, based on an initial distance of the wire contact to a surface of the connector and a traveled distance of the robot during insertion. The initial distance of the wire contact to the surface of the connector is established using images of the wire contact and the connector from at least two different angles.

Embodiments provided herein include a method for correction of automated insertion of a wire contact into a target hole of a connector, the method including: controlling a robot having an end-effector to align the wire contact with the target hole of the connector using a wire gripper of the end-effector; controlling the robot to advance the wire contact toward the target hole of the connector and at least partially insert the wire contact into the target hole; control the robot to cease insertion in response to a force between the wire contact and the connector exceeding a predefined value; determining a depth of insertion of the wire contact within the target hole of the connector; in response to the depth of insertion being above a predefined depth, controlling the robot to perform a pull test of pulling the wire contact away from the connector; in response to the depth of insertion being below a predetermined depth: identify an error condition using visual feedback; determining a number of corrective operations performed; performing an error correction operation in response to the number of corrective operations being below a predetermined number; and moving the wire contact away from the target hole in response to the number of corrective operations being above the predefined number.

According to some embodiments, performing an error correction operation includes: controlling the robot to adjust an orientation of the wire contact to be oriented perpendicular to a front surface of the connector; and controlling the robot to re-insert the wire contact into the target hole of the connector. Adjusting an orientation of the wire contact to be oriented perpendicular to a front surface of the connector, in some embodiments, comprises: determining an orientation of the wire contact relative to the connector; projecting the orientation of the wire contact onto a plane perpendicular to an orientation of the wire gripper to identify a resulting vector; and controlling the robot to adjust the orientation of the wire contact according to the resulting vector to be oriented perpendicular to a front surface of the connector. According to an example embodiment, adjusting an orientation of the wire contact to be oriented perpendicular to a front surface of the connector includes: determining an orientation of the wire contact relative to the connector; projecting the orientation of the wire contact onto a plane perpendicular to an orientation of the wire gripper to identify a resulting vector; increasing the resulting vector by a predetermined amount; and controlling the robot to adjust the orientation of the wire contact according to the increased resulting vector to be oriented perpendicular to a front surface of the connector.

According to an example embodiment, moving the wire contact away from the target hole further includes: controlling the robot to re-align the wire contact with the target hole; controlling the robot to advance the wire contact toward the target hole of the connector and at least partially insert the wire contact into the target hole; controlling the robot to cease insertion in response to a force between the wire contact and the connector exceeding a predefined value; determining a depth of insertion of the wire contact within the target hole of the connector; in response to the depth of insertion being above a predetermined depth, controlling the robot to perform a pull test of pulling the wire contact away from the connector; and providing for an indication of successful insertion of the wire contact into the target hole of the connector in response to the pull test satisfying predetermined criteria.

Embodiments provided herein include an apparatus having at least one processor and at least one memory including computer program code, the at least one memory and computer program code configured to, with the processor, cause the apparatus to at least: control a robot having an end effector to align the wire contact with the target hole of the connector using a wire gripper of the end effector; control the robot to advance the wire contact toward the target hole of the connector and at least partially insert the wire contact into the target hole; control the robot to cease insertion in response to a force between the wire contact and the connector exceeding a predefined value; determine a depth of insertion of the wire contact within the target hole of the connector; in response to the depth of insertion being above a predetermined depth, control the robot to perform a pull test of pulling the wire contact away from the connector; in response to the depth of insertion being below a predetermined depth: identify an error condition using visual feedback; determine a number of corrective operations performed; perform an error correction operation in response to the number of corrective operations being below a predefined number; and move the wire contact away from the target hole in response to the number of corrective operations being above the predefined number.

Causing the apparatus to perform an error correction operation includes, in some embodiments, causing the apparatus to: control the robot to adjust an orientation of the wire contact to be oriented perpendicular to a front surface of the connector; and control the robot to re-insert the wire contact into the target hole of the connector. According to some embodiments, causing the apparatus to adjust an orientation of the wire contact to be oriented perpendicular to a front surface of the connector includes causing the apparatus to: determine an orientation of the wire contact relative to the connector; project the orientation of the wire contact onto a plane perpendicular to an orientation of the wire gripper to identify a resulting vector; and control the robot to adjust the orientation of the wire contact according to the resulting vector to be oriented perpendicular to a front surface of the connector.

According to some embodiments, causing the apparatus to control the robot to align the wire contact with the target hole of the connector includes causing the apparatus to: acquire images from at least two different angles using one or more image acquisition devices; identify a location of the target hole; identify an alignment direction to align the wire contact with the target hole of the connector; and control the robot to move the wire contact in the alignment direction in a plane orthogonal to an axis along which the wire contact extends. According to an example embodiment, causing the apparatus to move the wire contact away from the target hole includes causing the apparatus to: control the robot to re-align the wire contact with the target hole; control the robot to advance the wire contact toward the target hole of the connector and at least partially insert the wire contact into the target hole; control the robot to cease insertion in response to a force between the wire contact and the connector exceeding a predetermined value; determine a depth of insertion of the wire contact within the target hole of the connector; in response to the depth of insertion being above a predetermined depth, control the robot to perform a pull test of pulling the wire contact away from the connector; and provide for indication of a successful insertion of the wire contact into the target hole of the connector in response to the pull test satisfying predetermined criteria.

BRIEF DESCRIPTION OF THE DRAWINGS

Figure 1:
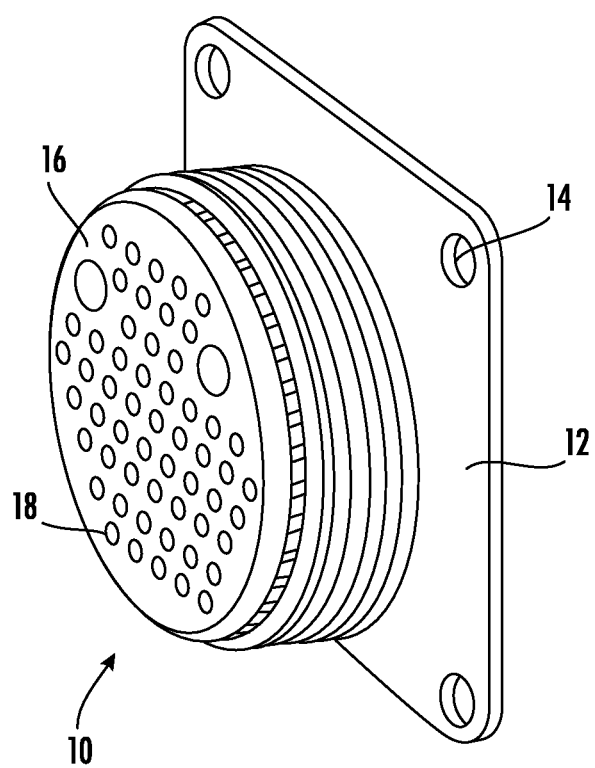
Figure 2:
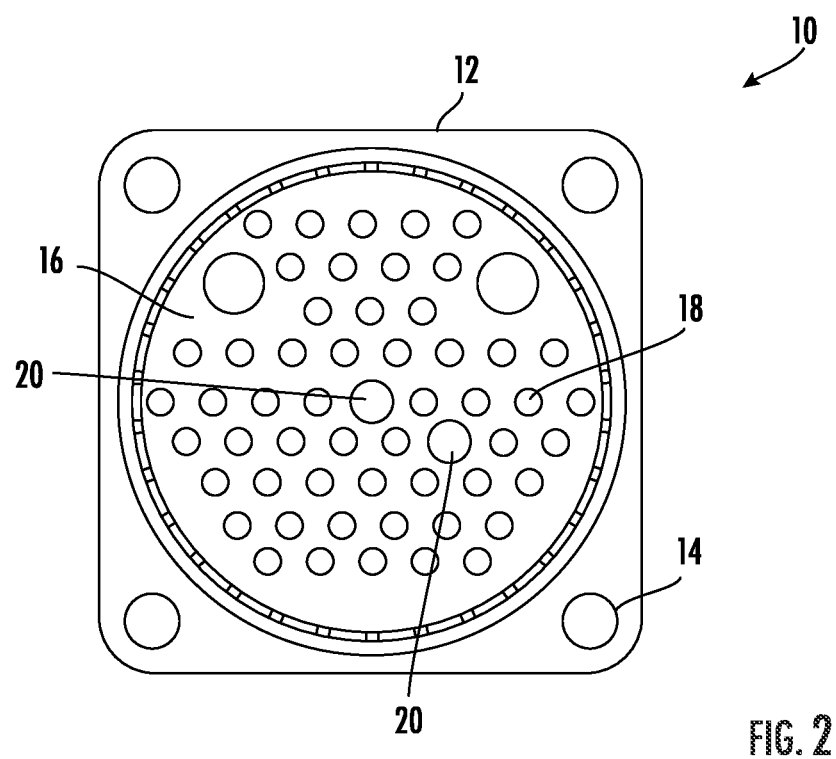
Figure 3:
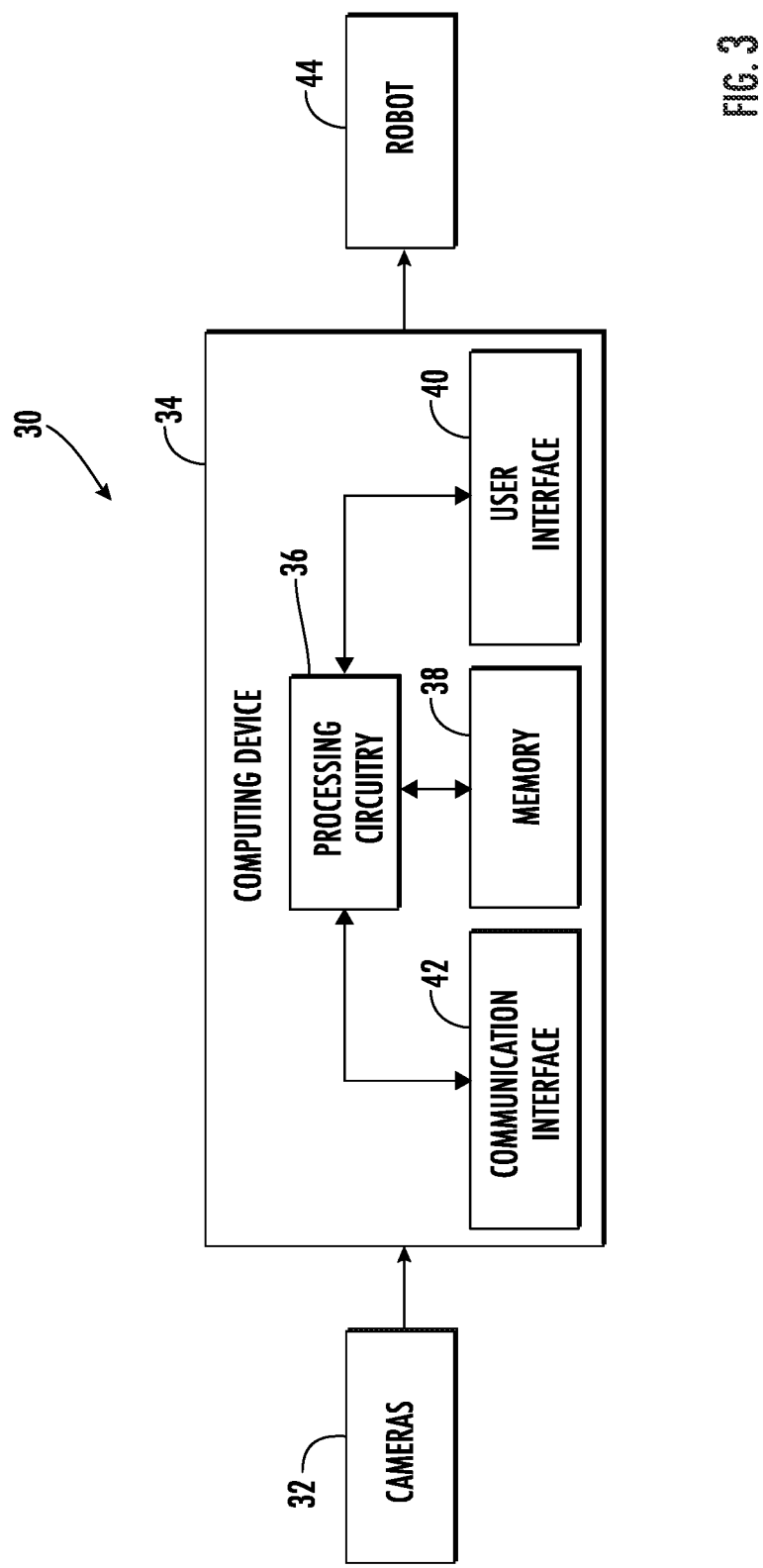
Figure 4:
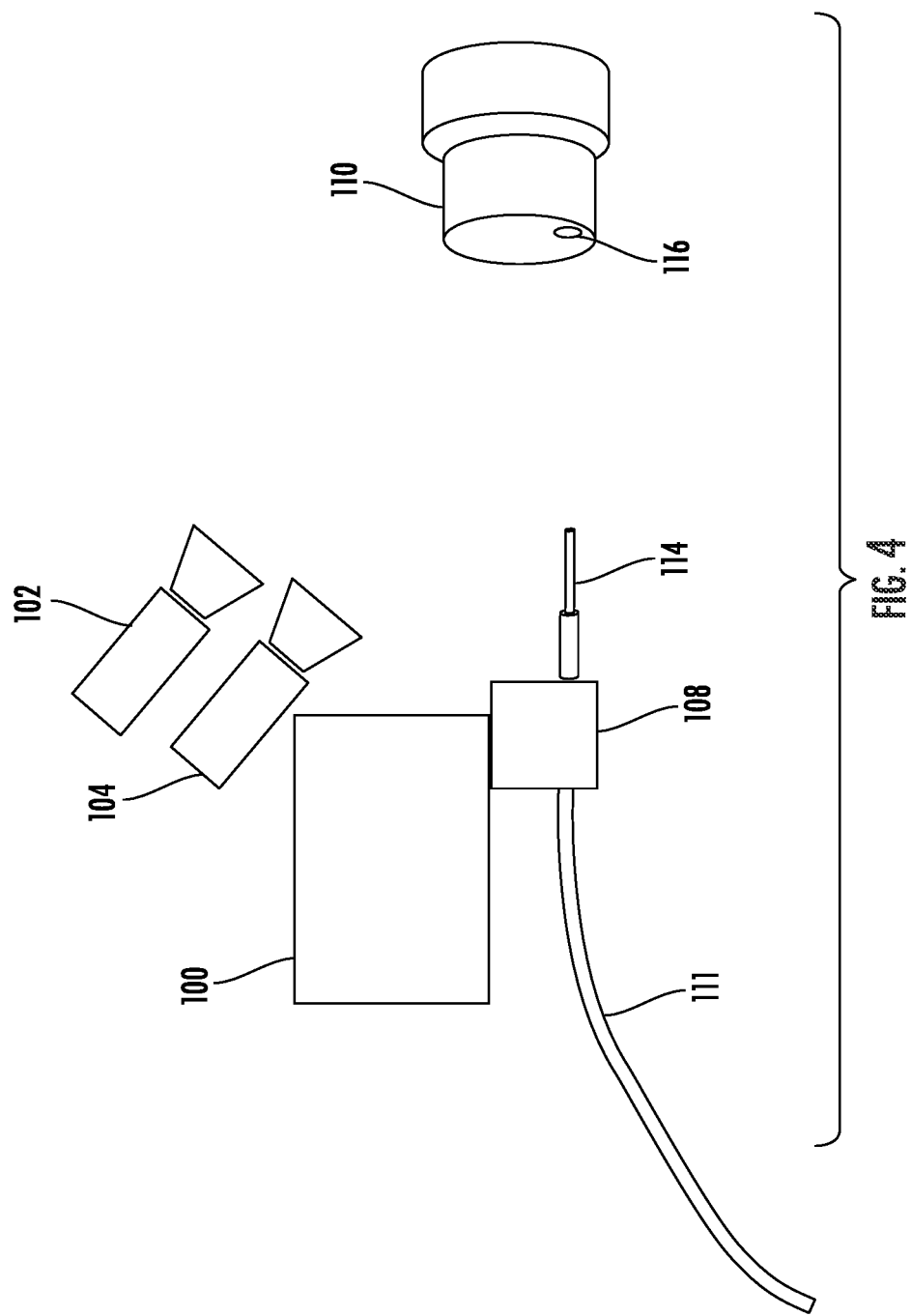
Figure 5:
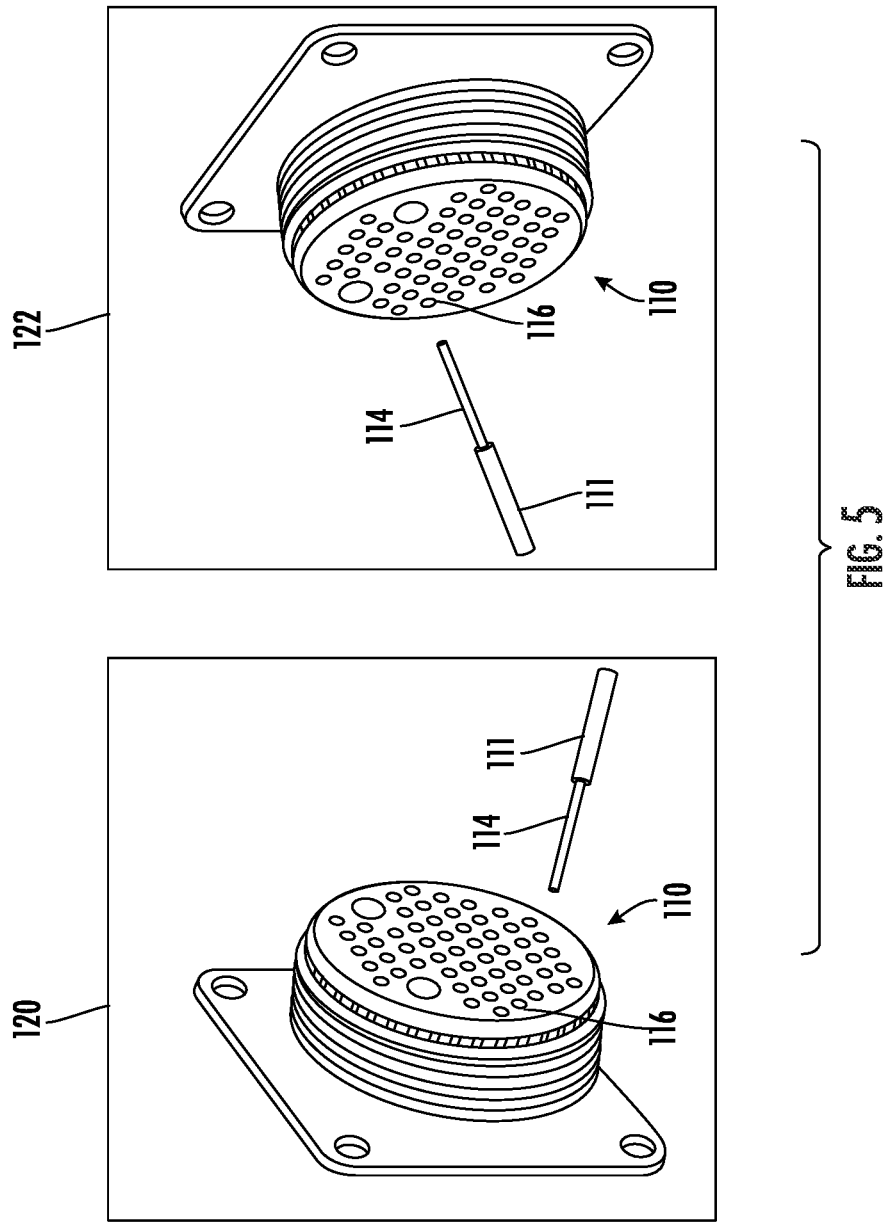
Figure 6:
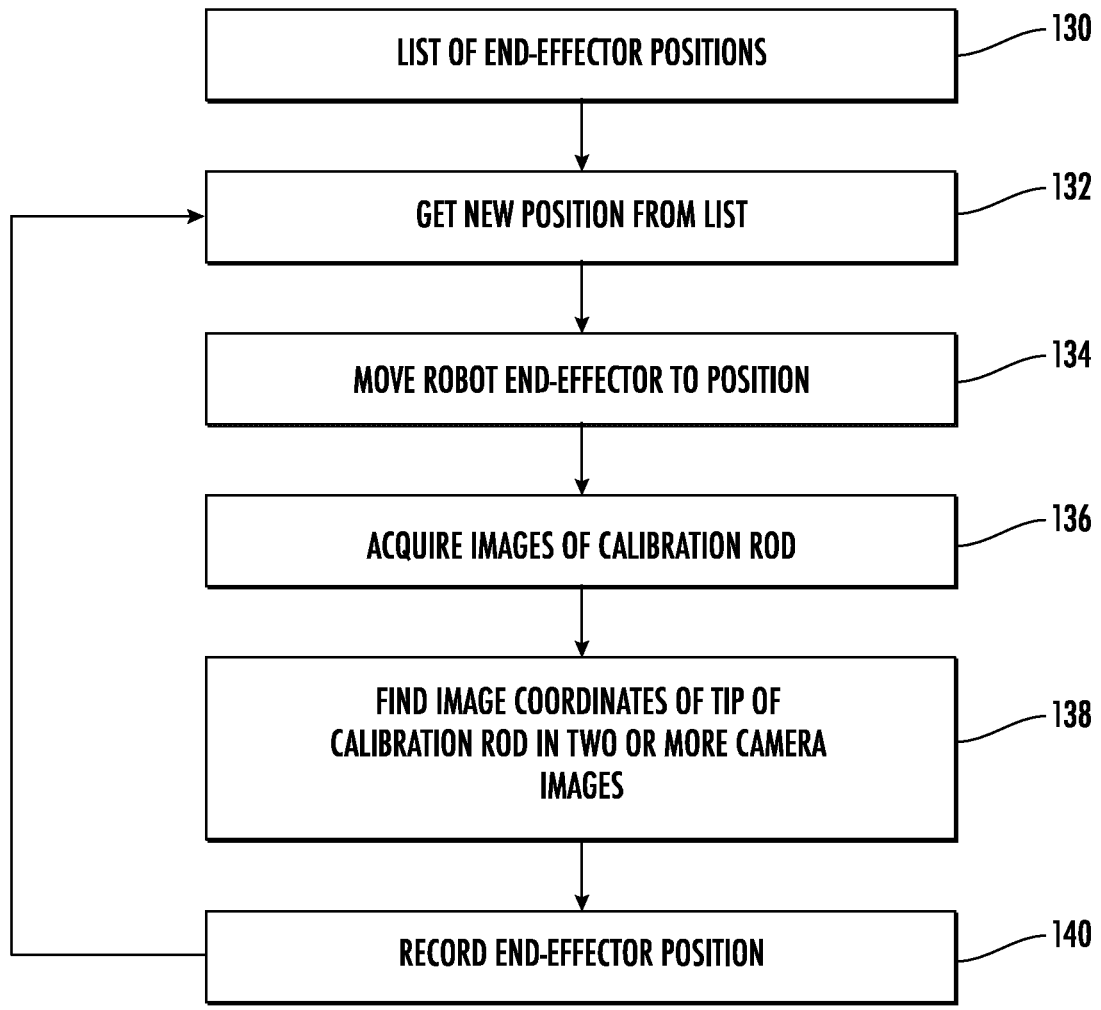
Figure 7:
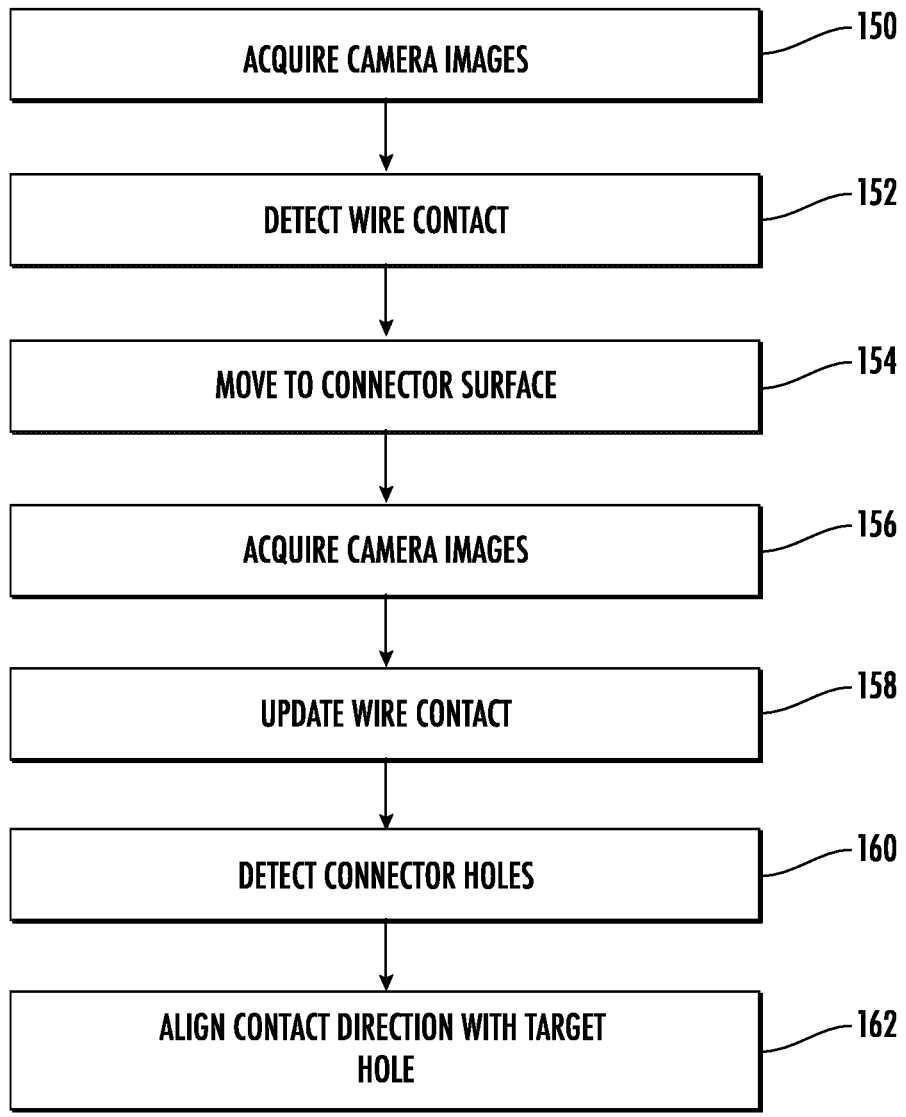
Figure 8:
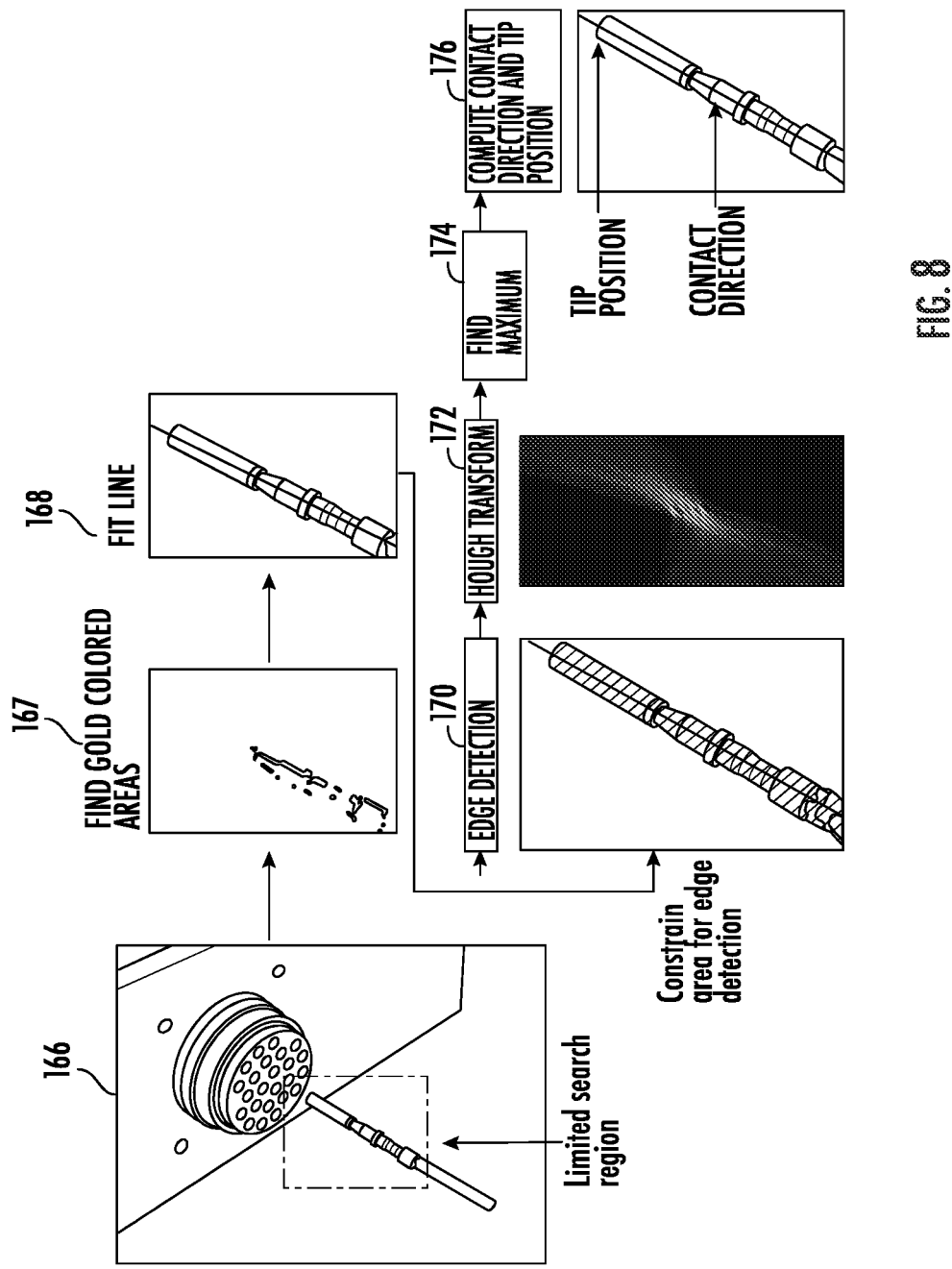
Figure 9:
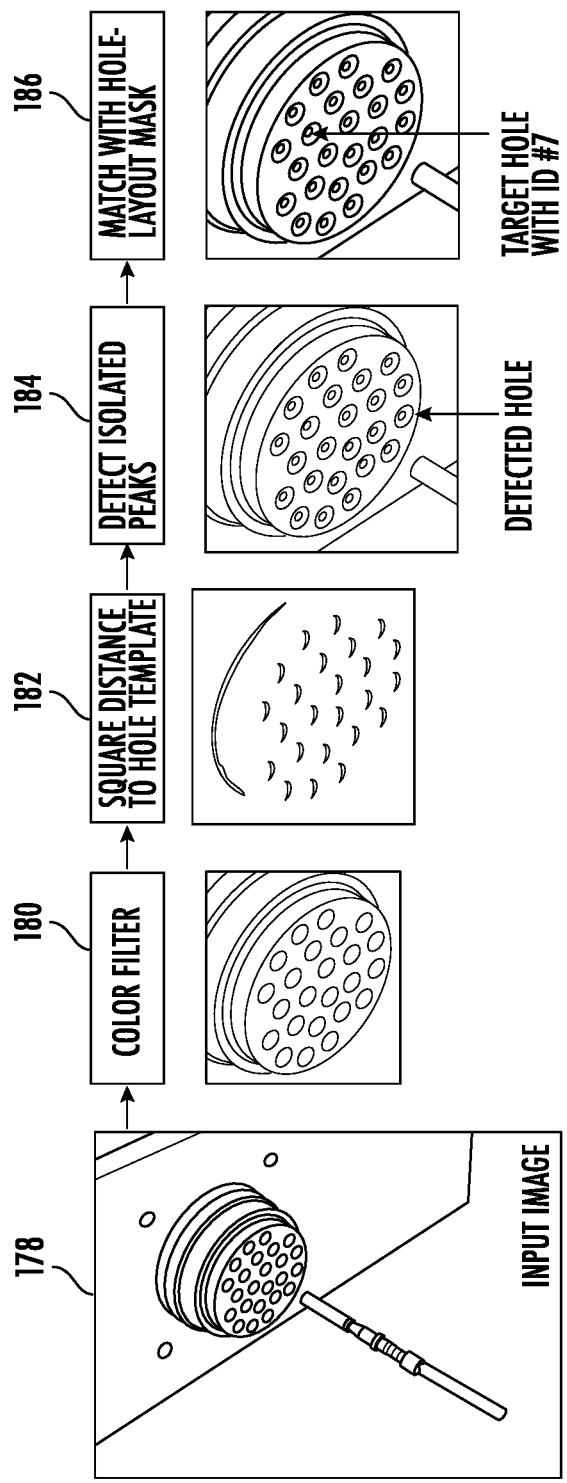
Figure 10:
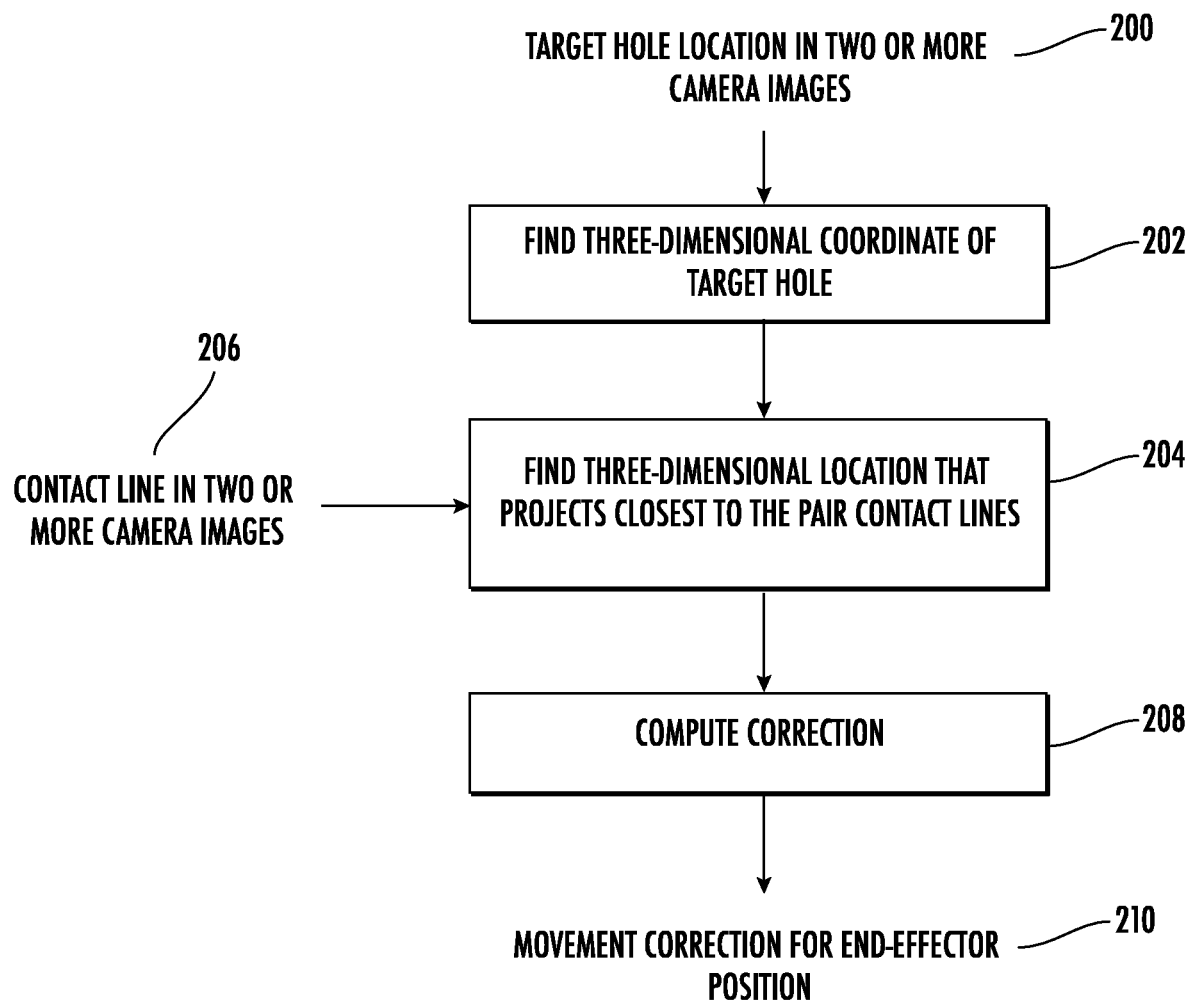
Figure 11:
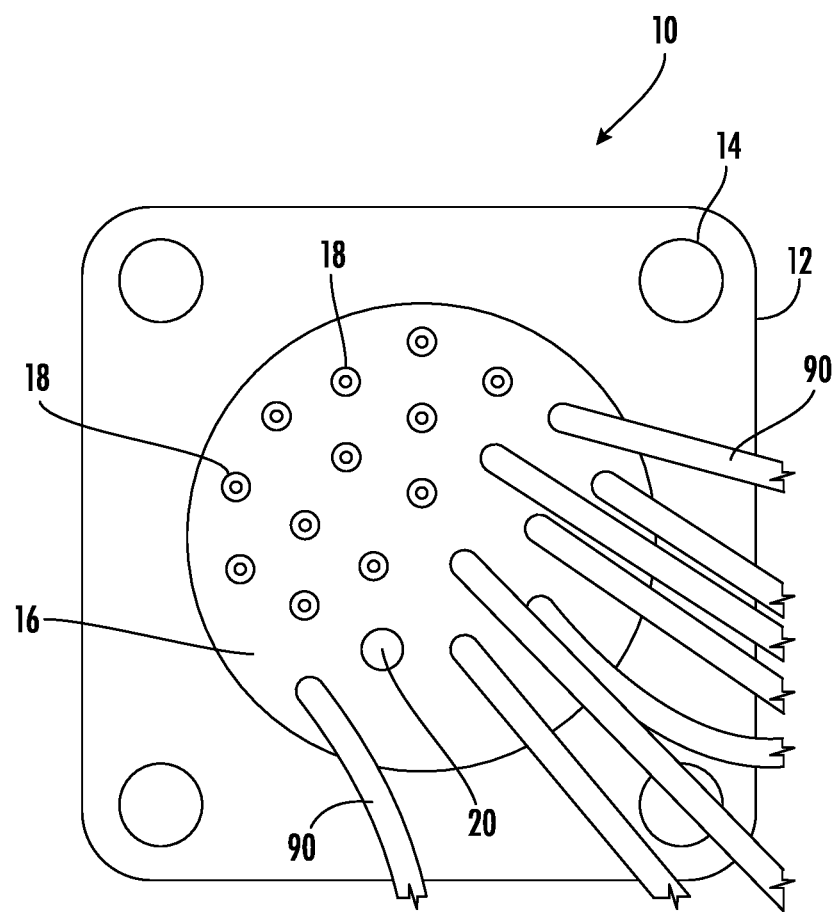
Figure 12:
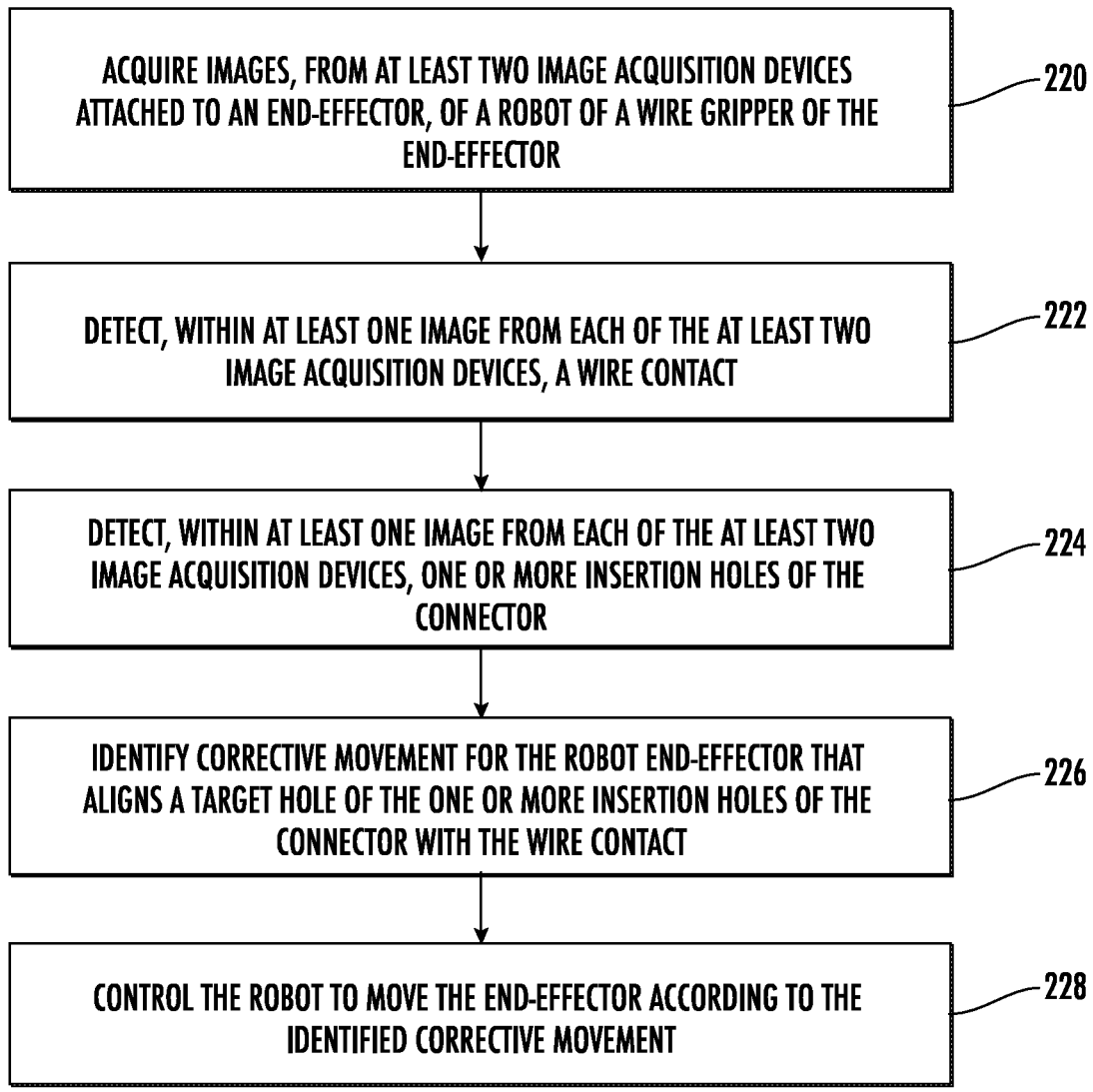
Figure 13:
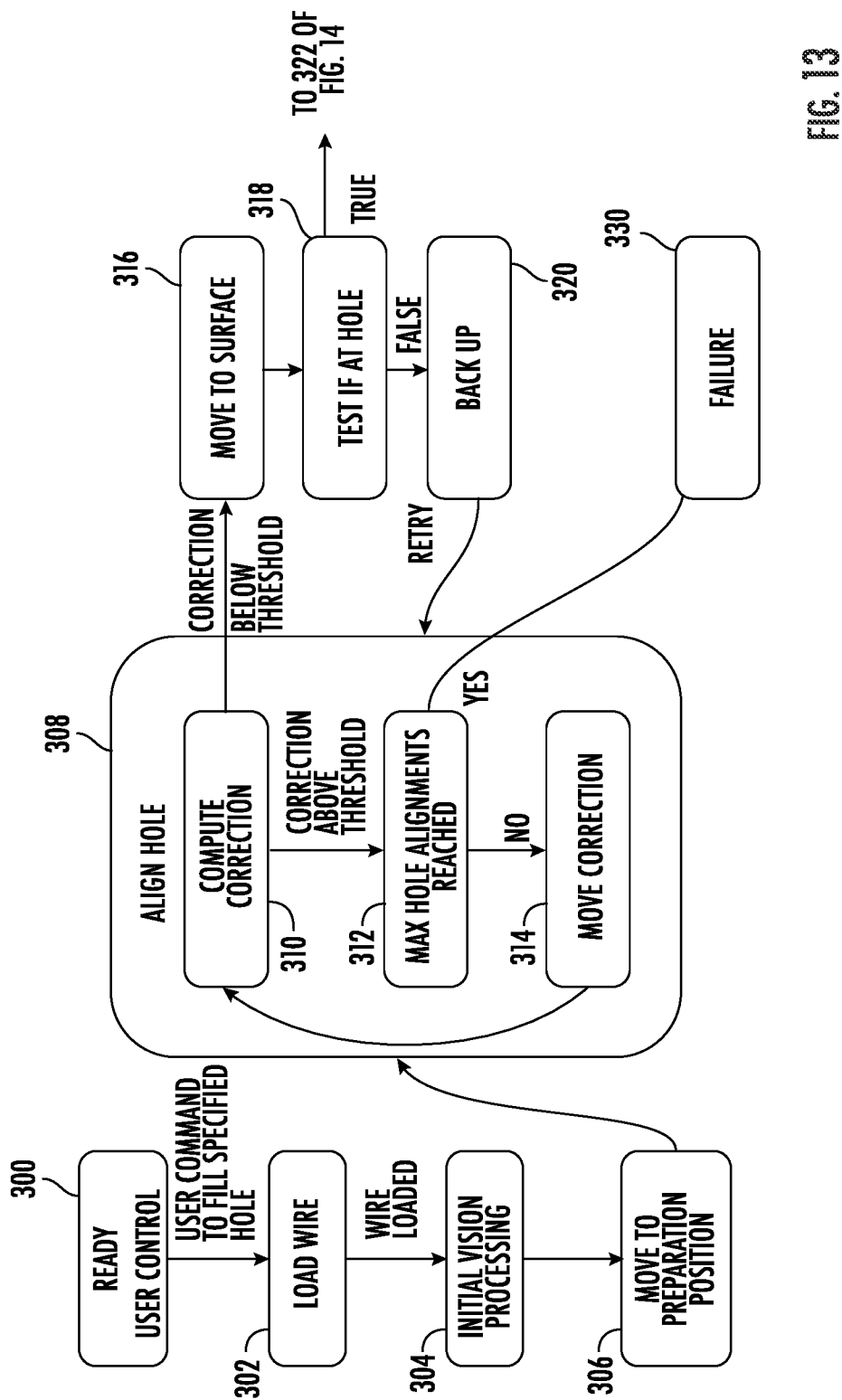
Figure 14:
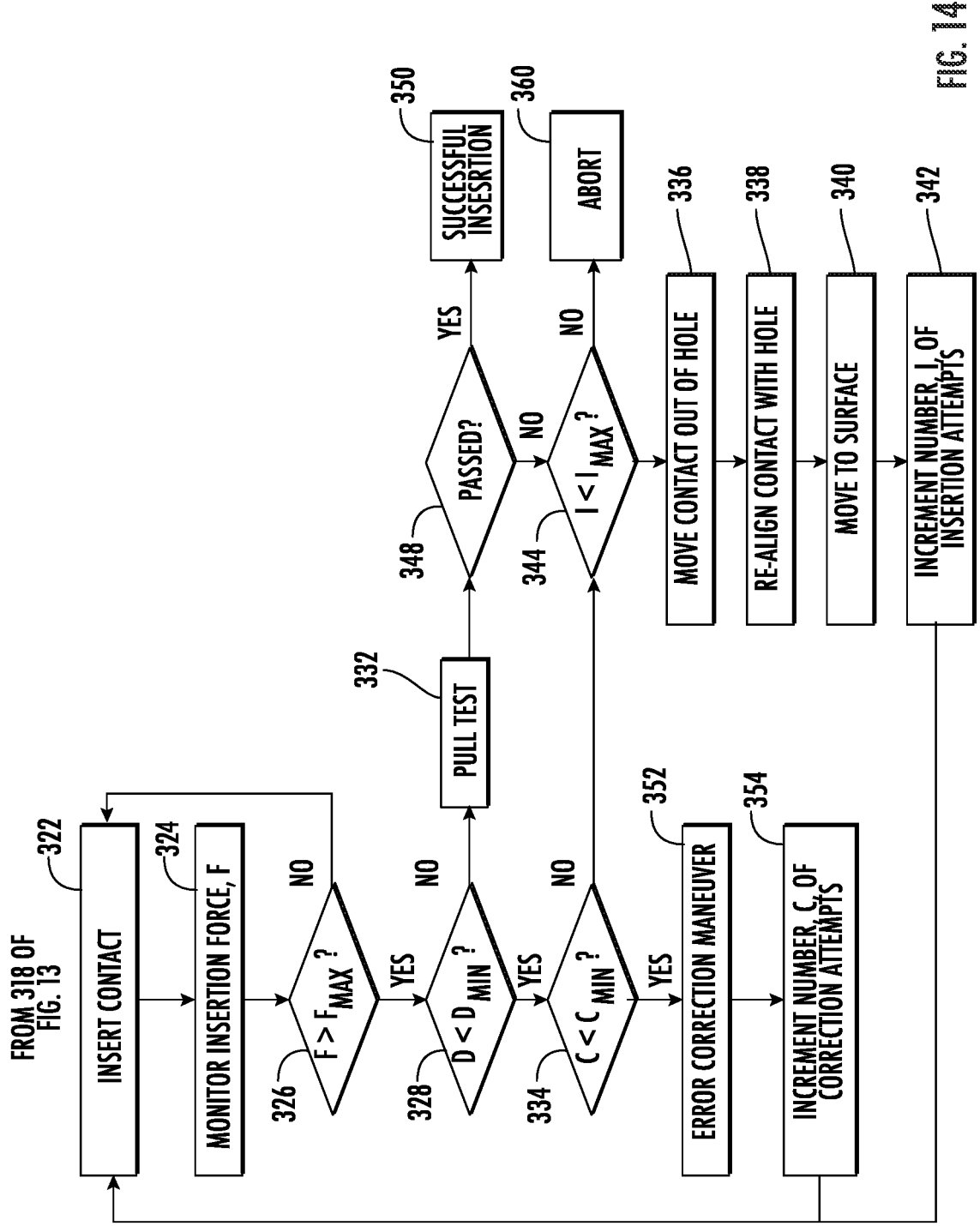
Figure 15:
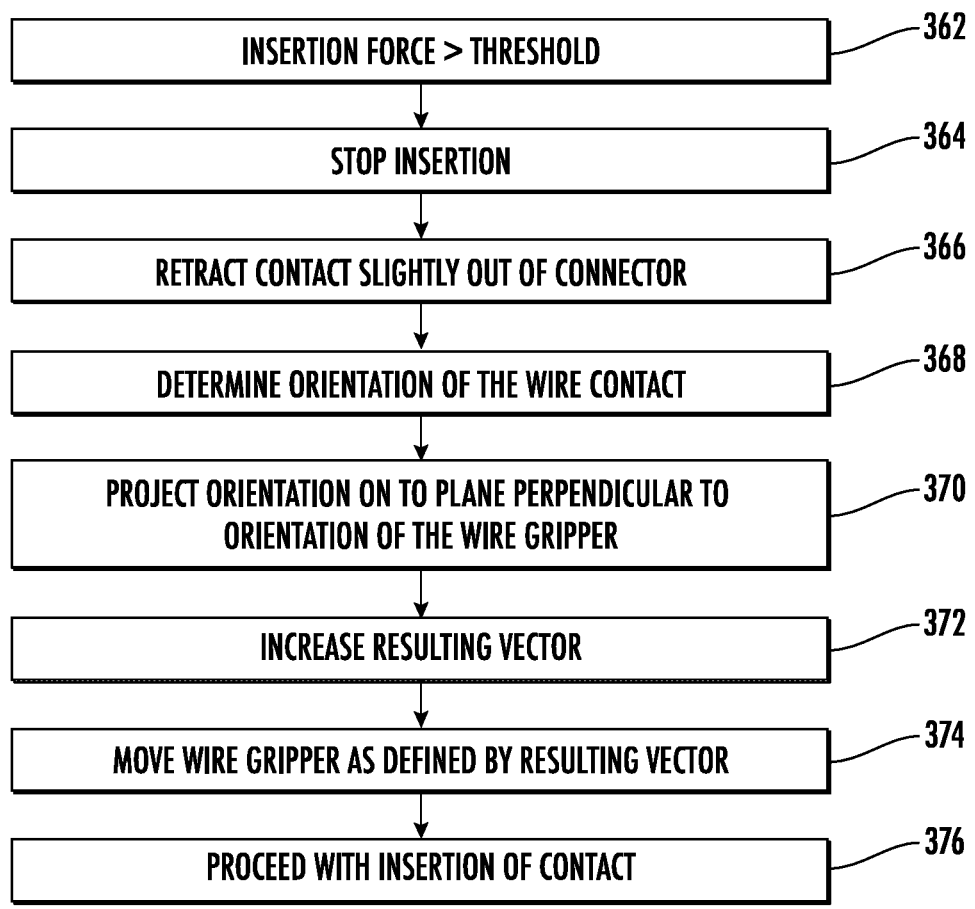
Figure 16:
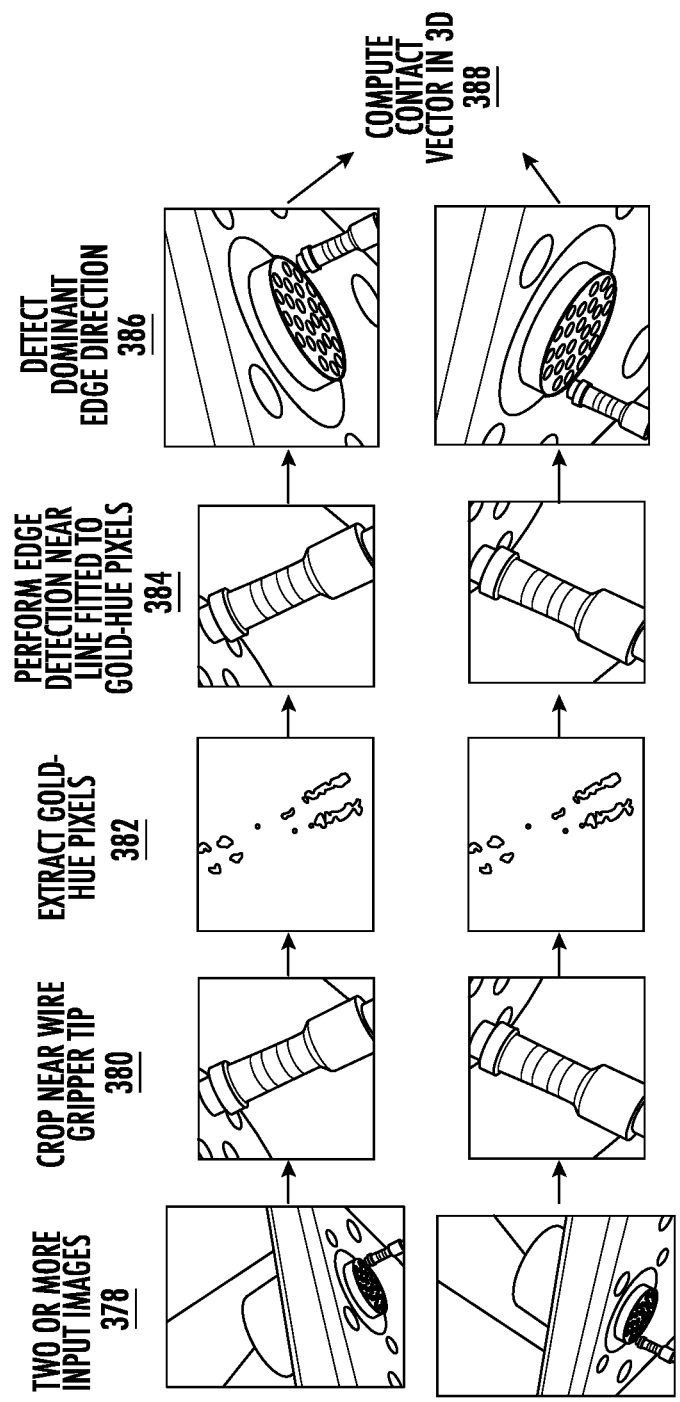
Figure 17:
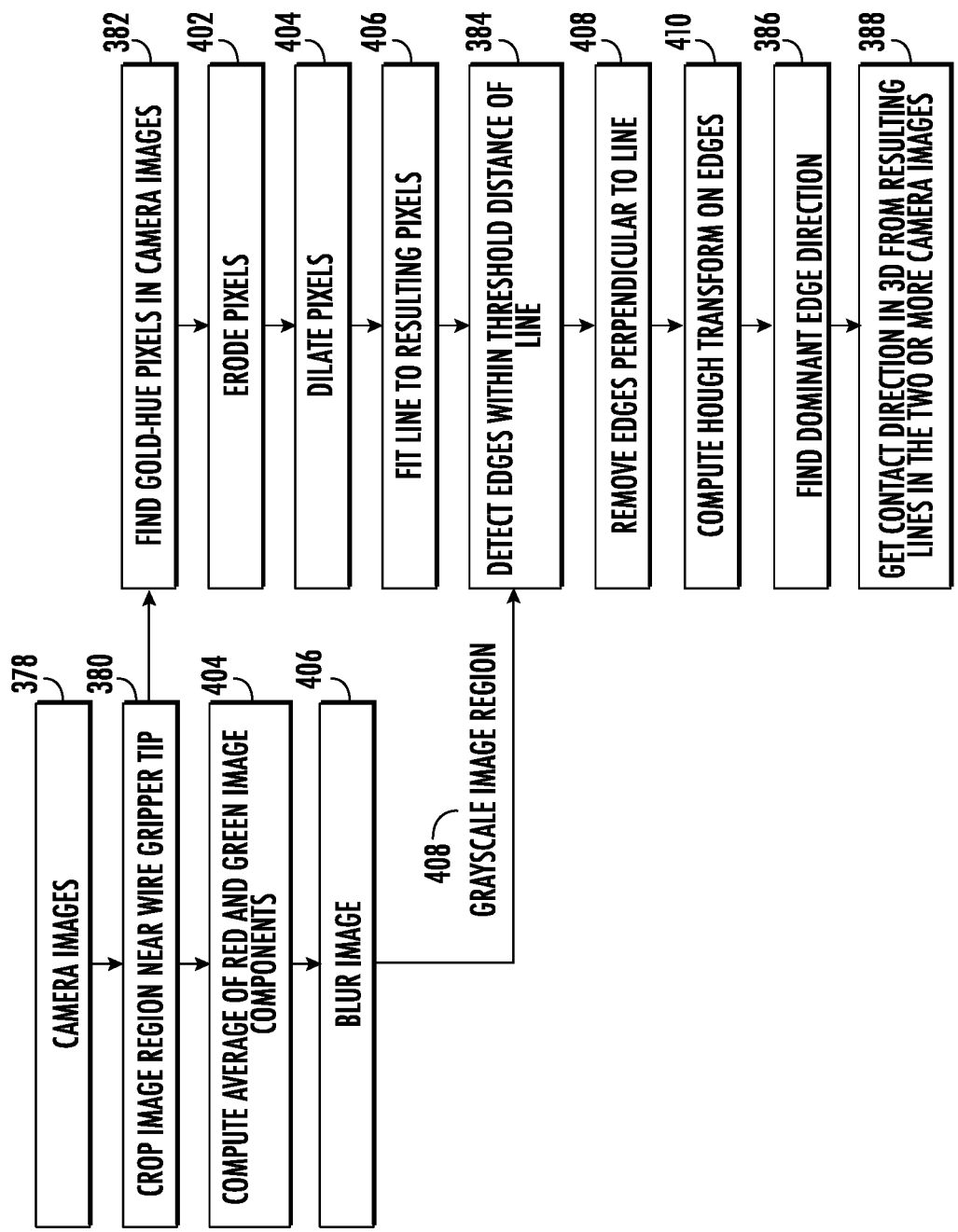

Having thus described certain example embodiments of the present disclosure in general terms, reference will hereinafter be made to the accompanying drawings which are not necessarily drawn to scale, and wherein:

FIG. 1 is a perspective view of a connector according to an example embodiment of the present disclosure;

FIG. 2 is a front view of the connector of FIG. 1 according to an example embodiment of the present disclosure;

FIG. 3 is a block diagram of the system that may be specifically configured in accordance with an example embodiment of the present disclosure;

FIG. 4 depicts a robot end-effector, wire gripper, and image acquisition devices according to an example embodiment of the present disclosure;

FIG. 5 illustrates images of a connector acquired by the image acquisition devices of the robot end-effector of FIG. 4 according to an example embodiment of the present disclosure;

FIG. 6 is a flowchart of a calibration routine for calibrating the image acquisition devices relative to the wire gripper and robot end-effector according to an example embodiment of the present disclosure;

FIG. 7 is a flowchart of a process for aligning a wire contact with a target insertion hole according to an example embodiment of the present disclosure;

FIG. 8 illustrates the process to extract the wire contact direction and tip position from an image according to an example embodiment of the present disclosure;

FIG. 9 illustrates the process flow for detecting contact holes in connectors according to an example embodiment of the present disclosure;

FIG. 10 is a flowchart of a process for aligning the wire contact direction with a target hole of the connector according to an example embodiment of the present disclosure;

FIG. 11 illustrates a connector with a wire bundle attached thereto using example embodiments of the alignment technique described herein;

FIG. 12 is a flowchart of a process for aligning a wire contact with a target hole of a connector according to an example embodiment of the present disclosure;

FIG. 13 is a process flow of a method for aligning and inserting wire contacts with target holes of a connector according to an example embodiment of the present disclosure;

FIG. 14 is a flowchart of a process for insertion of a wire contact within a target hole of a connector according to an example embodiment of the present disclosure;

FIG. 15 is a flowchart of a process for automated error correction according to an example embodiment of the present disclosure;

FIG. 16 illustrates a method of image processing to determine wire contact orientation according to an example embodiment of the present disclosure;

FIG. 17 is a flowchart of a process for image processing to determine wire contact orientation according to an example embodiment of the present disclosure; and FIG. 18 is a flowchart of a method for insertion of a wire contact into a target hole of a connector with automated error correction according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, system, and computer program product are provided in accordance with an example embodiment described herein for automated alignment of wire contacts with insertion holes of a connector and to provide error correction thereof, and more particularly, to provide correction of improperly inserted wire contacts during automated contact insertion into connectors. The process described herein detects wire contact and insertion holes simultaneously using robotic-end-effector-mounted cameras. Using simultaneous detection, embodiments of the disclosed method provide feedback for corrective movements of a robot arm used to insert the wire contacts into the insertion holes of the connector. The movements of the robot arm align the wire contact with a target insertion hole for successful insertion into an appropriate hole of a connector.

According to an example embodiment, during insertion of the wire contact into the target connector insertion hole, a force feedback sensor of the robot arm or robotic end effector monitors the insertion force. If the force exceeds a predetermined value, the insertion is temporarily stopped. A check of the insertion depth is performed based on an initial distance to the connector and a travel distance of the robotic end effector. The initial distance can be estimated through vision using the aforementioned cameras or based on measured robot movement relative to the connector. If the insertion depth is above a minimal distance, established based on the type of wire contact and connector, a pull test is carried out. If the depth is below the predetermined value, the wire connector is identified as stuck and an error-correction maneuver is needed. The correction of the wire contact direction is performed only if the number of such corrections is below a threshold number of attempts. If the number of such corrections exceeds the threshold number of attempts, the robot end effector moves the wire contact outside the connector hole and alignment of the wire contact with the connector hole is repeated.

The assembly of wire bundles including the attachment of one or more wire connectors to the wire bundle has traditionally been a labor-intensive process that is both time consuming and introduces opportunities for errors in the assembly. Embodiments described herein enable the automatic assembly of wire bundles and their associated wire connectors and provide a mechanism for automated error correction with respect to insertion of wire contacts into connector holes. In particular, embodiments provide for the automatic insertion of wire ends into connectors, and correcting errors of insertion automatically. Embodiments described herein may use a robot arm with a robot end effector to insert the wires, supporting a flexible layout of connectors and wires.

A method, system and computer program product are provided in accordance with an example embodiment in order to identify wire contacts and wire contact insertion holes defined by a connector in order to align and insert the wire contacts into the wire contact insertion holes, and to provide for error correction with respect to insertion of the wire contacts into a respective target insertion hole of a connector. Although the method, system and computer program product may be configured to identify the wire contacts and wire contact insertion holes of a variety of different types of connectors, the connectors generally define a plurality of wire contact insertion holes or connector holes within a housing with the wire contact insertion holes being arranged in a predefined configuration. Different connectors may include different numbers of wire contact insertion holes and may include wire contact insertion holes arranged in different configurations.

One example of a connector is depicted in FIGS. 1 and 2 in the form of a connector 10. As shown, the connector 10 includes a housing 12 and a rubber grommet 16 disposed therein. Although the housing 12 may be configured differently for other types of connectors, the housing of the connector 10 of the embodiment of FIGS. 1 and 2 is externally threaded to facilitate, for example, the secure threaded engagement of a wire bundle assembly or another connector therewith. The connector 10 of FIGS. 1 and 2 also includes a radially extending flange defining a plurality of openings 14, such as for receiving screws or other fasteners for mounting the connector to an assembly. Although the connector 10 of FIG. 1 has a cylindrical shape, the connector of other example embodiments may have different sizes and shapes. In regards to the example connector of FIGS. 1 and 2, a rubber grommet 16 is disposed within the housing and the rubber grommet defines a plurality of wire contact insertion holes 18. The wire contact insertion holes 18 defined by the rubber grommet 16 are configured, e.g., sized and shaped, such that a wire end consisting of a wire contact connected, e.g., crimped, to the end of a wire, is inserted into and mechanically retained within the wire contact insertion hole 18. In some, but not all embodiments, the rubber grommet may also include a plurality of wire contacts in alignment with respective wire contact insertion holes defined by the rubber grommet such that the wire end may be brought into secure electrical contact with a respective wire contact of the connector.

As shown by the example of the connector 10 of FIGS. 1 and 2, the plurality of wire contact insertion holes 18 defined by the rubber grommet 16, are arranged in a predefined pattern. In some embodiments, not all of the wire contact insertion holes of a connector 10 will be utilized and, instead, only a subset of the wire contact insertion holes will receive and make electrical connection with corresponding wire ends of the wire bundle assembly. As illustrated in FIG. 2, the wire contact insertion holes 18 defined by the rubber grommet 16 that are not to be utilized in conjunction with a particular application may be eliminated from further consideration by the insertion a plug 20 into the respective wire contact insertion hole defined by the rubber grommet. Although a connector 10 that may be analyzed in accordance with an example embodiment of the present disclosure is depicted in FIGS. 1 and 2 and will be described hereinafter, the method, system and computer program product of an example embodiment may be utilized in conjunction with a wide variety of other connectors and the connector is illustrated and described by way of example, but not of limitation.

The plugs 20 of a wire connector may be used to fill holes that may not be used for the wire bundle being assembled. For example, a connector may have twenty wire contact insertion holes 18; however, a wire bundle feeding the connector 10 may include only 18 wires and corresponding wire contacts. In such an embodiment, the unused wire contact insertion holes may be plugged with plugs 20 such that there is less or possibly no opportunity for water, moisture, or other corrosive/oxidizing substance to enter the connector and contaminate the wires and wire contacts.

Referring now to FIG. 3, a system for identifying wire contact insertion holes 18 of a connector 10, inserting wire contacts into corresponding wire contact insertion holes 18, and providing error correction for automated wire contact insertion is depicted. As shown, the system 30 includes cameras 32 configured the acquire images of the connector 10. While plural cameras are indicated in FIG. 3, embodiments may employ a single camera, or may employ a single camera operating with mirrors to provide various perspectives of the connector 10 using a single camera. The cameras described herein are a type of image acquisition device, where a variety of image acquisition device types may be used in place of a camera. Image acquisition devices, generally, acquire an image of the field of view of the device. A camera, as described herein, acquires an image of the field of view in the visible light spectrum and processes the image accordingly. The cameras 32 may be configured to acquire a gray scale image of the connector 10. Alternatively, the cameras 32 may be configured to acquire color images of the connector 10. In an embodiment in which color images of the connector 10 are acquired, the image associated with each different color channel of the cameras 32, such as the red, green and blue color channels, may be averaged to create a composite image for subsequent analysis and review. Alternatively, the different color channels of the cameras 32 may be separately analyzed. The cameras 32 are generally configured to acquire images of the front face of the connector 10, such as shown in FIG. 2, such that the plurality of wire contact insertion holes 18 defined by the rubber grommet 16 are clearly visible. The cameras 32 may also be configured to acquire images of the wire contacts during alignment of the wire contacts with the connector 10. As such, the image acquired by the cameras 32 of an example embodiment may be acquired at a plurality of angles to provide different perspectives of the connector 10 and wire contacts.

In addition to the cameras 32, the system 30 of FIG. 3 includes a computing device 34 configured to analyze the images of the connector 10 acquired by the cameras and to identify wire contact insertion holes of the connector and wire contacts. The system 30 may also be configured to identify plugs 20 within a connector 10. As also shown in FIG. 3, the system 30 of an example embodiment also includes or is in communication with a robot 44 and, more particularly, a robotic end effector that is utilized to insert wire ends/contacts into respective candidate contact insertion holes of the connector 10 based upon the identification of the wire contact insertion holes of the connector and wire contacts by the computing device 34.

The computing device 34 may be configured in various manners and, as such, may be embodied as a personal computer, a tablet computer, a computer workstation, a mobile computing device such as a smartphone, a server or the like. Regardless of the manner in which the computing device 34 is embodied, the computing device of an example embodiment includes or is otherwise associated with processing circuitry 36, memory 38, and optionally a user interface 40 and a communication interface 42 for performing the various functions herein described. The processing circuitry 36 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 36 is configured to execute instructions stored in the memory 38 or otherwise accessible to the processing circuitry. These instructions, when executed by the processing circuitry 36, may cause the computing device 34 and, in turn, the system 30 to perform one or more of the functionalities described herein. As such, the computing device 34 may comprise an entity capable of performing operations according to an example embodiment of the present disclosure while configured accordingly. Thus, for example, when the processing circuitry 36 is embodied as an ASIC, FPGA or the like, the processing circuitry and, correspondingly, the computing device 34 may comprise specifically configured hardware for conducting one or more operations described herein. Alternatively, as another example, when the processing circuitry 36 is embodied as an executor of instructions, such as may be stored in the memory 38 the instructions may specifically configure the processing circuitry and, in turn, the computing device 34 to perform one or more algorithms and operations described herein.

The memory 38 may include, for example, volatile and/or non-volatile memory. The memory 38 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 38 may comprise any non-transitory computer readable storage medium. The memory 38 may be configured to store information, data, applications, instructions, or the like for enabling the computing device 34 to carry out various functions in accordance with example embodiments of the present disclosure. For example, the memory 38 may be configured to store program instructions for execution by the processing circuitry 36.

The user interface 40 may be in communication with the processing circuitry 36 and the memory 38 to receive user input and/or to provide an audible, visual, mechanical, or other output to a user. As such, the user interface 40 may include, for example, a display for providing an image acquired by the camera 32 and/or an image visually depicting the closest match between the candidate contacts and a predetermined template as described below. Other examples of the user interface 40 include a keyboard, a mouse, a joystick, a microphone and/or other input/output mechanisms.

The communication interface 42 may be in communication with the processing circuitry 36 and the memory 38 and may be configured to receive and/or transmit data, such as by receiving images from the camera 32 and transmitting information, such as a list of candidate contact insertion holes, contact ID numbers and locations of the candidate contact insertion holes in a connector-based coordinate system, to a robot 44 and/or a robotic end-effector. Although referenced herein as candidate contact insertion holes, contact ID numbers and locations of the candidate contact insertion holes, the list of candidate contact insertion holes, contact ID numbers and locations of the candidate contact insertion holes is to be interpreted so as to be associated with the candidate contact insertion holes themselves and/or wire contacts aligned with the respective candidate contact insertion holes in those embodiments that include such wire contacts. The communication interface 42 may include, for example, one or more antennas and supporting hardware and/or software for enabling communications with a wireless communication network. Additionally or alternatively, the communication interface 42 may include the circuitry for interacting with the antenna(s) to cause transmission of signals via the antenna(s) or to handle receipt of signals received via the antenna(s). In some environments, the communication interface 42 may alternatively or also support wired communication.

Referring now to FIG. 4, an example embodiment of a system performing the methods described herein is shown including a robot end-effector 100, which may include a tool head having three or more degrees of freedom, and image acquisition devices including a first camera 102 and a second camera 104. The robotic end-effector 100 may carry a wire 111 in a wire gripper 108 including a wire contact 114 at the leading end of the wire 111. A connector 110 is disposed in a fixed location as it is approached by the robotic end-effector 100. The connector is illustrated with a single target insertion hole 116; however, the single target insertion hole is shown for ease of understanding as connectors will include a plurality of target insertion holes. The two cameras 102, 104 are mounted on the robotic end-effector 100 in such a way as to view both the wire 111 including the wire contact and the connector 110 simultaneously.

While the embodiment of FIG. 4 includes two cameras, embodiments may include more cameras. Further, a single camera may be used in conjunction with mirrors to observe different perspectives of the wire contact and the connector using the single camera. Capturing multiple perspectives, such as using two or more cameras, may enable accurate positioning of the wire contact and the connector as they are joined.

According to example embodiments described herein, images are acquired of the wire 111 and wire contact 114 along with the connector 110 from more than one perspective. Using the different perspectives, a line is identified that extends in the direction of the wire and wire contact and a hole in the connector that is the target hole for the wire is identified. FIG. 5 illustrates images 120, 122 acquired by two different image acquisition devices, such as the cameras 102 and 104 of FIG. 4 of the wire 111 including wire contact 114 and the connector 110, specifically the identified target insertion hole 116 of the connector into which the wire 111 is to be inserted. A line, identified through multiple perspectives, provides at least a stereoscopic indication of the relationship between the wire contact and the target hole of the connector into which the wire is to be inserted, and may be identified based on the axial projection of the wire 111 and wire contact 114. Based on the identified line from the images, a movement command may be computed that would place the hole on the line in at least two images. This may initially establish a rotation of the end-effector to bring the tip of the wire gripper 108 perpendicular to the connector surface. To place the hole on the line, a movement is established in parallel to the connector surface to align the line with the appropriate target hole of the connector. A movement command is the desired displacement of the robot end-effector in three-dimensional cartesian space. Aligning the wire contact with the hole places the wire in a proper position to enable the robot to move the wire along the line toward the appropriate hole of the connector for insertion.

Embodiments described herein may calibrate the cameras ahead of using them to align the wire with the target hole of the connector. The purpose of the calibration is to compute a mapping of three dimensional Cartesian coordinates onto a two dimensional image coordinates. The calibration may be carried out before wires are fed to the robotic wire gripper of the end-effector. Calibration is not necessary before every wire insertion or before every connector change, but may be necessary when camera settings change, such as the focus, zoom, orientation, etc.

FIG. 6 depicts a process flow of an example calibration procedure. The illustrated procedure uses a small calibration rod, which may be, for example, a small plastic rod of around an inch in length and having a distinct tip such as a red tip. According to some embodiments, the calibration rod may include a small sphere on a needle such as a computer-aided measurement machine calibration stylus or simply a small dot on a piece of paper. The calibration rod is used to provide an easily identifiable point visible in each camera field of view from the different camera perspectives. The calibration rod may be mounted firmly with the tip facing up and within reach of the robot end-effector. In preparation for calibration, the robotic end-effector is advanced to be in front of the calibration rod, such that the calibration rod's tip position mimics the expected position of a connector surface (e.g., the surface into which the connector holes are formed). The calibration procedure may begin with a list of end-effector positions, as shown at 130. One example for such a list are the three-dimensional coordinates of nodes in a 3×3×3 cubic grid, where neighboring nodes are one centimeter apart. A constraint for generating this list may be that for each coordinate of the end-effector, the tip of the calibration rod must be visible in all camera images.

A new position of the end-effector positions is obtained at 132. The robot loops through the list of end effector locations by moving the robot end-effector to the obtained position at 134, capturing images of the calibration rod at 136, finding the coordinates of the tip of the calibration rod in both camera images at 138, and recording the end effector position at 140. The process loops back to get a new position from the list until all end-effector positions have been used for calibration, or at least a predefined number of end-effector positions to provide a satisfactory calibration. In each image acquired, the location of the tip of the calibration rod is identified. To identify the tip, the image may be color filtered (e.g., by computing R−(G+B)/2 for each pixel, where R, G, and B are the Red, Green, and Blue color channels, respectively). The average location of all pixels having an intensity value above a predefined value may then be computed. The predefined value may be chosen such that only the tip of the calibration rod is selected. It may be beneficial to have a light source above the calibration rod such that the tip is sufficiently illuminated and may stand out in the acquired images. The result of this calibration procedure are the two-dimensional image coordinates of the tip of the calibration rod in each camera image.

Once the calibration routine of FIG. 6 is complete, the result is a list of three-dimensional end-effector positions in the end-effector coordinate frame and corresponding two-dimensional image coordinates for each camera. This set of corresponding coordinates is used by an algorithm to calibrate each camera. For example, a Perspective-n-Point (PnP) algorithm may be used to calibrate each camera. A non-limiting example of a PnP algorithm may be the UPnP+ Gauss Newton algorithm. The result of this algorithm are two matrices for each camera: one that encodes the intrinsic parameters (like the focal length) and one that encodes the extrinsic parameters (position and pose of the camera). These matrices can be used to map a three-dimensional position in the robot's end-effector frame onto two-dimensional image coordinates. Using this calibration procedure, the camera locations do not need to be known in advance.

Once the cameras have been calibrated, a wire contact held by the robotic end-effector may be aligned with a connector. FIG. 7 illustrates the process of aligning a wire contact with a target insertion hole of a connector. After a wire is grasped by the wire gripper of the end-effector, whether the wire is placed in the wire gripper or picked-up by the wire gripper, images may be acquired by the cameras mounted on the end-effector at 150. In these images, the wire contact is detected and its direction obtained as shown in 152. This operation is further described below. The robot may then move the wire contact to be near the connector surface at 154. In this position, the cameras again acquire images at 156 to include the wire contact and the connector. From these images, two processes are computed: first the direction of the wire contact is updated at 158; and second, connector holes are detected at 160. By combining the output of these processes, the system computes a movement command in the robot end-effector coordinates to align the contact with a target hole at 162.

After the robot executes the first alignment step, camera images are again acquired and both contact and target hole positions updated. If this update yields a corrective movement command below a threshold (e.g., below 0.1 millimeters), the robot may not execute the correction and instead proceeds to move the contact toward the connector surface. The direction of the movement of the wire contact toward the connector surface matches the contact's direction in three-dimensions as obtained through the camera images. If the updated wire contact position yields a correction above the threshold, the robot may then make the corrective move and acquire new images, whereby the aforementioned process is repeated until the correction is below the threshold.

The number of repetitions of the process of FIG. 7 may be limited, such as to three attempts. After this limit, the robot may abort the alignment process and indicate an error, such as through an error message of a user interface. Alternatively, the robot may start again moving the contact near the connector surface as before. Three significant elements of the alignment process of FIG. 7 are described in greater detail below.

The detection of the wire contact is necessary to align the contact with a target hole and to understand the movement direction for the robot end-effector once the contact is aligned. FIG. 8 depicts the process to extract the direction of a wire contact from an image. In this example embodiment, the computing device 34, such as the processing circuitry 36, may be configured to perform the various operations of extracting the direction of a wire contact and tip position from the acquired images. The first operation is to extract a window of the image 166 in which the contact is expected to be. The image in the window may be color filtered (e.g., by using a single color channel) to produce an image of only the color of interest. According to an example embodiment in which the wire contacts are gold in color, the image may be color filtered to find the gold colored areas at 167. A fit line is established at 168 based on the gold colored areas extending along a linear direction. The fit line constrains the area processed for edge detection at 170, e.g., by using a 30-pixel wide corridor around the line. This corridor cuts out distracting edges in the background, e.g., from other wires. For edge detection, the Canny edge detection algorithm may be used. Non-limiting parameters of the Canny edge detector may be a sigma or two for Gaussian blurring and thresholds of 0.005 and 0.015 for edge tracing. Second, to detect lines, a Hough transform may be carried out on the edges as shown at 172. Third, using the resulting array from the Hough transform, the maximum may be found at 174 which corresponds to the longest line. By finding the maximum, the angle and orientation of the line and its distance from one of the image corners is identified. Around the maximum, nearby maxima are sought with the same line orientation. An example for these maxima is to have a value larger than 0.5 times the maximum from the Hough transform. These maxima may correspond to parallel lines in the direction of the contact. The center of the two extremal lines may be estimated as the position and orientation of the contact as shown at 176.

Once the direction of the contact is obtained, such as by the processing circuitry 36 of the computing device 34, the location of the tip of the contact is computed. To find the tip, the ends of all edge lines parallel to the contact may be determined. All ends may be projected onto the contact line. The projection that is furthest away from the image corner opposite the contact tip may be identified as the location of the tip. This process to obtain the contact direction and tip location may be repeated for at least two camera images acquired from different perspectives.

In the same way as for the wire contact, though without using the gold color filter described above, the tip of the wire gripper can be obtained by the processing circuitry 36 of the computing device 34. Here, images may be analyzed without the wire contact inserted in the wire gripper. Such images may be acquired during calibration. Since the wire gripper is fixed relative to the cameras, the wire gripper-tip location can be obtained as part of the calibration. Optionally, the gripper tip location can be computed in a process before a wire is gripped by the wire gripper.

Once the image coordinates of the wire gripper and contact tips are known in at least two camera views, the three-dimensional coordinates of the tips may be computed. To compute the three-dimensional coordinate of a point, virtual lines may be formed that extend from a camera location through the point in the image plane. These lines may be computed based on the extrinsic parameters of the cameras, as obtained during calibration. The three-dimensional coordinate may be obtained as the least-square solution that is closest to the virtual lines for at least two camera views. The direction of a contact in the three-dimensional end-effector coordinate frame may be computed as the vector difference between the contact tip three-dimensional location and the wire gripper tip three-dimensional location.

The contact hole detection is imperative to properly identify the correct hole of the connector into which the wire contact is to be inserted. In each camera image including the connector, contact holes are detected. FIG. 9 illustrates the corresponding process flow which may be performed by the processing circuitry 36 of computing device 34. At the beginning of the process, the robot end-effector is positioned in front of a connector such that the connector surface is fully visible in at least two camera images from different perspectives. For at least two of the camera images from different perspectives, the below-described process is followed.

An image is acquired by a camera mounted to the robot end-effector at 178. The image may be color filtered, such as using a red color filter by computing the R−(G+B)/2 for each pixel, where R, G, and B are the values for the red, green, and blue light channels respectively. The color filter may be selected according to the color of a connector such that the filter best identifies differences in the connector surface that may correlate to holes of the connector. To crop the image, the median image coordinate of the color-filtered intensity image is computed, and a window is cut out centered on the location of the median, as shown at 180. Alternatively, the window may be centered at the tip of the wire contact. The size of the window depends upon the type of connector and may be a pre-specified parameter, such as a size of 270×270 pixels, sufficient to clearly identify each hole of the connector. The color of the filter used should correspond to the color of the connector.

The processing circuitry 36 may then be used to compute the square distance between a hole template and a local image patch from the intensity image for each patch location over the image as shown at 182. An example of a hole template may include an 18×18 pixel wide intensity gradient that mimics the shading inside a hole, where the intensity along the gradient may follow a function $f(x)=1/(1+\exp(-x/1.7))$. The intensity of the template may be scaled to match minimum and maximum values of the color-filtered intensity image. This scaling increases the robustness to changes in lighting. The result of this operation may include an intensity image in which low intensity areas (black) are areas of short distance to the hole template.

Using the intensity image may be used, such as by the processing circuitry 36 of computing device 34, to isolate extrema identified in the image. These extrema correspond to contact holes and are local minima in the distance image. To identify a local minimum, an elliptical boundary around each pixel may be analyzed. The size of the boundary may depend on the distance between neighboring holes on a connector. As a non-limiting example, the elliptical boundary may include half-axis lengths of 25 and 15 pixels, where the longer axis is in the horizontal direction approximating the elliptical shape of the holes in the camera image as the image is not coaxial with the connector. Pixels may be discarded as extrema candidates if they have one or more pixels in their boundary with an intensity below the candidate pixel's intensity times a constant factor greater than one. This constant factor may depend on the connector type. For example, the constant factor may be around 1.7. A factor larger than one ensures that the extrema are more pronounced and may eliminate or reduce false detections. For each remaining candidate pixel, a weighted average may be computed over all pixels inside its elliptical boundary, where the weight is the inverse of the intensity of each pixel in the distance image.

If a total weight computed over all pixels inside an elliptical boundary is above a threshold (e.g., 2), then the weighted average may be identified as a hole and added to the list. The detection of isolated peaks is shown at 184 whereby holes of the connector are identified. To avoid that pixels of the same hole are counted as separate holes (double counting), all pixels inside an ellipse used for weighted averaging may be marked and automatically discarded as extrema candidates. The result of this operation is a list of contact holes. As an additional operation, outliers may be removed from the hole list. To remove outliers, first the minimum distance ($d_{min}$) may be computed between two holes. Second, any hole may be discarded as an outlier that has a distance to its nearest neighbor hole that is larger than a constant factor times $d_{min}$ (e.g., the constant factor of 2).

The hole list may be matched against known hole locations from technical specifications and/or drawings of the connector. This matching can compensate for missed holes and allow for assignment of hole identification numbers to the detected holes. From the technical drawing of a connector, a two-dimensional mask of hole locations may be extracted. This mask may include a list of contacts with the identities and locations in a connector-centered coordinate system. To match the mask to the hole list, the mask may be rotated (in three axes) and translated (in three directions) in the end-effector coordinate system such that it optimally overlaps with the hole list. To compute the overlap, the mask may be projected onto each camera image using the parameters from the camera calibration. The cost function for optimization may be the sum of square distance between the holes from the list and their closest neighboring projected holes. A non-limiting example of an algorithm to optimize this cost function may include Powell's method.

The aforementioned processes provide, for each camera image analyzed, the line describing the wire contact and the location of the target hole. Based on this information, the corrective movement for the robot end-effector can be computed. The target hole location in two or more camera images is identified at 200. The three-dimensional location "p" of the target hole in the end-effector coordinate system is computed at 202. To compute this location, an optimization algorithm is used that minimizes the sum of square distances between the target hole two-dimensional image locations and the projections of the three-dimensional location on to the camera images. A non-limiting example for an optimization includes Powell's method. Here, the three-dimensional location may be constrained to lie in the plane of the connector surface. This plane may be known due to the mask-optimization process described above, which rotates and translates the mask to match the connector surface.

A location "r" is computed in the end-effector coordinate system that projects closest to the contact line in each image as shown at 204. This location may be also constrained to lie in the plane of the connector surface. An optimization algorithm may be used to compute "r". Based on the resulting values of "p" and "r", the corrective movement may be computed at 208 as c=p−r. The movement of the end-effector may be carried out at 210.

The identified target hole of the connector for the wire contact may then be utilized to facilitate insertion of wire ends into respective wire contact insertion holes of the connector. In this regard, a wire may be identified by a wiring diagram or the like to be inserted into a particular wire contact insertion hole of the connector (and, in some embodiments, also into electrical contact with a respective wire contact that is aligned with the wire contact insertion hole) with the particular wire contact insertion hole being identified by a contact ID number, which may be identified on the connector via the aforementioned map of identifiers for the connector. Prior to insertion into the wire contact insertion hole of the connector, a wire contact is generally connected to, e.g., crimped upon, a bare end of the wire to form a wire end. Based upon the contact ID numbers and corresponding locations of the candidate contact insertion hole for the connector 10, a wire end may be inserted into the connector at the location associated with a contact insertion hole having the contact ID number of the wire contact insertion hole 18 into which the wire is to be inserted. The computing device 34, such as the processing circuitry 36, may be configured to determine the candidate contact insertion hole into which a wire is to be inserted based upon the contact ID number of a candidate contact insertion hole, such as based upon correspondence between the contact ID number of a candidate contact insertion hole and the contact ID number of the wire contact insertion hole 18 into which the wire end is to be inserted as defined by a wiring diagram or the like. The computing device 34, such as the processing circuitry 36, is also configured to determine the position of a robot 44 and, more particularly, a robotic end-effector utilized to insert the wire end into the candidate contact insertion hole based upon the location of the candidate contact insertion hole in the connector-based coordinate system and using the alignment methods described above for efficient and repeatable insertion of wires into corresponding holes of the connector.

As such, the computing device 34, such as the processing circuitry 36, may effectively drive a robot 44, such as a robotic end-effector, or otherwise provide information, such as a list of candidate contact insertion holes, contact ID numbers and corresponding locations in the connector-based coordinate system, to the robot sufficient to drive the robotic end-effector in such a manner as to insert the wire ends of a wire bundle assembly into corresponding wire contact insertion holes 18. See, for example, FIG. 11 in which a plurality of wires 90 have been inserted into respective wire contact insertion holes 18 of the connector 10 in order to establish mechanical connection between the wire ends and the connector 10. By facilitating the automation of the connection process associated with a wire bundle assembly, the system 30, method and computer program product of an example embodiment increase the efficiency with which wire ends of a wire bundle assembly may be mechanically connected to a connector 10 and correspondingly reduce the error rate and cost of the resulting assembly.

While the aforementioned process involves aligning a single wire contact for insertion, embodiments of the present disclosure may be used to align and insert a plurality of wire contacts into a respective plurality of target holes of a connector. However, the order in which wire contacts are inserted into target holes may be established in such a manner as to not diminish the effectiveness of the alignment methods described herein. As discussed above, the wire contact and the target hole must each be visible in at least two camera images from two different perspectives for proper alignment. If wire contacts are inserted into the connector in an improper order, a target hole of the connector may be obstructed from view of one or more cameras. As such, an order of assembly may include starting with target holes of the connector which are furthest from the cameras, such as the bottom of the connector in the example configuration shown herein. In this manner, wires will be inserted to the connector from the bottom-up to avoid an inserted wire obstructing the camera view of a target hole. A plurality of cameras from a plurality of different perspectives may mitigate the installation order requirement as when a camera view of a target hole is obstructed, provided the target hole remains visible in at least two images from at least two perspectives, the process described herein can be performed effectively.

FIG. 12 is a flowchart of a process for aligning a wire contact with a target hole of a connector according to an example embodiment of the present disclosure. As shown, images are obtained from at least two image acquisition devices, such as cameras 32 of system 30, attached to an end-effector of a robot, where the images are of a wire gripper of the end effector, at 220. At 222, a wire contact is detected, such as by processing circuitry 36 of computing device 34, within at least one image from each of the at least two image acquisition devices. Within at least one image from each of the at least two image acquisition devices, one or more insertion holes of the connector are detected at 224, such as by processing circuitry 36 of computing device 34. Corrective movement of the robot end effector is identified at 226, such as by processing circuitry 36 of computing device 34, that aligns a target hole of the one or more insertion holes of the connector with the wire contact. At 228, the robot (44 of system 30 of FIG. 3) is caused, such as by processing circuitry 36 via communications interface 42, to move the end-effector according to the identified corrective movement.

Once the alignment of the wire contact with the target hole of the connector is performed, the wire contact may be inserted into the target hole for assembly of the connector and wire bundle thereof. Initially, a wire contact may be moved by the wire gripper of the end-effector of the robot to a preparation position proximate the target hole. The alignment is performed in a plane parallel to the surface of the connector, while insertion is performed on an axis orthogonal to the plane of the surface of the connector.

During insertion, the robot end effector 100 and/or the wire gripper 108 may include one or more sensors for determining one or more forces acting on the wire 111 or the wire contact 114. Forces may be sensed by virtue of resistance encountered by the motive force of the robot (e.g., a servo motor, a hydraulic pump, etc.). Forces may optionally be sensed by a strain gauge arrangement which may be disposed on the wire gripper and configured to sense resistance to movement of the wire gripper or wire/wire contact held therein. Various other force sensing arrangements may be employed as necessary to determine forces acting on the wire contact 114 of the wire 111 held by the wire gripper 108.

FIG. 13 illustrates a process flow according to the aforementioned described method of alignment and insertion of a wire contact with a target hole of a connector. As shown, the process begins at 300 with a connector mounted and ready to receive a wire contact in a target hole. The wire including the wire contact is loaded at 302 into a wire gripper (e.g., 108 of FIG. 4) of an end-effector (e.g. 100) of a robot. Initial vision processing is performed at 304, such as using cameras 102 and 104 of FIG. 4. The end-effector may then move the wire gripper and wire to the preparation position 306. At 308, alignment of the wire contact with the target hole is performed, such as by using the process detailed above. As shown, the corrective transformation is computed at 310, using the process described in detail above. If the correction transformation is below a threshold amount, the alignment is considered complete and the process continues. If the correction transformation is above a threshold, the number of corrective transformations already completed is checked at 312, and if it is below a threshold number, the corrective transformation occurs at 314. If the number of corrective transformations exceeds a predefined number, a failure may be identified at 330. However, if the corrective transformation is successful at 314 and results in an alignment below a threshold corrective transformation, then the wire gripper holding the wire contact is moved toward the connector at 316.

The process of FIG. 13 continues at 318 whereby movement of the wire gripper toward the connector to a position in which misalignment would cause contact but not damage to the wire contact or connector. If force feedback on the wire gripper exceeds a threshold value, it may be determined that the wire contact is not aligned with the target hole, such that the wire contact is retracted at 320 and alignment is again performed at 308. If the force feedback at the wire gripper is below a threshold, the wire contact is established as being aligned with the target hole. In this way, the wire gripper is prevented from damaging the connector during insertion of the wire contact.

If the wire contact is established to be at the target hole of the connector whereby operation 318 is established to be true, the process of insertion continues as shown in FIG. 14. As shown, the insertion process begins at 322. During insertion, the robot end effector and/or wire gripper monitors the insertion force, F, at 324. If the force is above a predetermined value at 326, for example 16 Newtons, a value which may be dependent on the type of contact and the type of connector, the insertion may be temporarily halted. Once temporarily halted, a determination is made with respect to the depth of the insertion at 328. The insertion depth can is estimated based on the initial distance to the connector and the travel distance of the robot end effector. The initial distance can be estimated through vision, such as through the image processing described above identifying the location of the connector relative to the wire connector. If the depth of insertion d is above a minimum depth $d_{min}$, a pull test is conducted at 332. The pull test will be described further below.

If the depth of insertion d is less than a minimum depth $d_{min}$, this is an indication that the contact is stuck and an error correction maneuver is needed at 352. The error correction maneuver is described further below. The error correction maneuver is carried out only if the number of such error corrections, c, is below a threshold number, $c_{min}$, which may be, for example, five attempts. This determination is shown at 334. If the number of correction attempts is greater than the threshold number $c_{min}$, the robot end effector and wire gripper move the wire contact outside of the connector hole 336 and the alignment of the wire contact with the hole is repeated at 338. This may be the alignment process of 308 of FIG. 13, for example. After the contact direction alignment has been corrected at 338, the wire connector is moved to the surface of the connector at 340 and the number of insertion attempts i, is incremented at 342 before insertion begins again at 322. This process is repeated until the pull test 332 is executed, or the maximum number of insertion attempts ($i_{max}$) has been reached at 344. When starting the realignment process of 338, the number of corrections c is reset to zero. If the pull test 332 passes at 348, the insertion is completed with a successful insertion 350. If the pull test fails, the tool head moves the contact again outside of the connector 336 for realignment 338 unless the maximum number of insertion attempts i has been reached. Once the number of insertion attempts reaches a maximum number ($i_{max}$), the wire contact insertion process is deemed to have failed and the process is aborted at 360.

The pull test operation may be performed to confirm seating of the wire contact within the connector as shown above at operation 332. For the pull test, the wire gripper may pull back on the wire, away from the connector, until a specific distance or force threshold is reached. If the force threshold is reached before the specified distance, then the wire contact is confirmed as properly seated. If the specified distance is reached before the force threshold is achieved, the wire insertion failed as the wire is determined to not be fully seated.

The error correction maneuver of operation 352 provides an automated correction of the wire contact direction. FIG. 15 illustrates a flowchart of the process for the error correction maneuver. When the insertion force is above the predefined threshold F. of operation 326 in FIG. 14, the insertion is stopped at 364. With the depth less than a minimum insertion depth of operation 328 and the number of error correction maneuvers c is below the maximum of $c_{max}$ attempts, the error correction maneuver begins with retraction of the wire contact slightly out of the connector at 366 but still partially inserted within the connector. An orientation of the wire contact is determined at 368. The orientation may be determined based on images acquired from different angles of the wire contact and the connector, such has with cameras 102 and 104 capturing images of the wire contact 114 and the connector 110. Based on the wire contact direction established in the images, the orientation of the wire contact may be projected onto the plane perpendicular to the orientation of the wire gripper at 370. This projection of the orientation is a contact direction vector in three-dimensional Cartesian space. The contact direction vector lies on the two-dimensional plane perpendicular to the wire gripper and at least approximately parallel to the connector surface. This projection is performed such that the corrective movement is made in the plane of the connector surface. The projected vector (V) is multiplied by a multiplier that is greater than one (e.g., 1.5), which results in a corrective movement step (V*1.5). This corrective movement step is increased as shown at 372 to improve the probability of moving the contact around any obstacles internal to the connector. The wire gripper is moved as defined by the resulting vector (1.5*V) at 374, and the insertion is resumed at 376 corresponding to insertion 322 of FIG. 14.

The determination of the orientation of the wire contact at operation 368 is important to the success of the error correction maneuver. The main operations using two or more camera images are illustrated in FIG. 16, while the flowchart of FIG. 17 illustrates elements of the process of determining the orientation of operation 368 in FIG. 15. As shown in FIG. 16, two or more images from at least two different angles are used as input at 378. The image region near the wire gripper tip is cropped at 380. The size of this region may be, for example, 200 by 200 pixels, while the camera field of view may be 1600 by 1200 pixels. Gold-hue pixels are found in the images at 382. While gold-hue pixels are found in the example embodiment, other hues may be used based on the components of the wire contact, such as silver. Pixels of the chosen color can be extracted by first converting the cropped images to HSV (Hue, Saturation, Value) color space, and subsequently thresholding the HSV values. For example: 20<=H<=28; 100<=S<=180; and 80<=V<=255, where the maximum range of H is - to 180, S is - to 255, and V is - to 255. To remove noise, erosion and dilation operations may be carried out. The process flow is shown in greater detail in FIG. 17, where the pixels of the image are eroded at 402, and pixels remaining are dilated at 404. The parameter for these operations may be a kernel size of 4-by-4 pixels, for example.

A line is fitted to the resulting pixels at 406 in the process flow of FIG. 17. To make the line fit more robust to single outlier pixels, a loss function may be employed that increases less than quadratic with the distance from the line for pixels that are beyond a certain threshold distance. For example, the Huber distance can be used as defined by:

$$\rho(r) = \begin{cases} r^2/2 & \text{if } r < C \\ C \cdot (r - C/2) & \text{otherwise} \end{cases}$$

Where C=30 pixels, and r is the distance to the fitted line.

Edge detection is then performed at 384 in the cropped images. The edge detection may be limited to pixels that are within a certain distance (e.g., 15 pixels) of the above-described fitted line. This limitation prevents the image detection from picking up edges from wires that might be located below the contact (e.g., with previously inserted wire contacts). The edges are further cleaned up through edge removal of edges that are perpendicular to the fitted line at 408 of the process flow of FIG. 17. An example algorithm may include Canny Edge Detection, for example.

A Hough transform may be carried out on the edges of the image as shown at 410 of the process flow of FIG. 17. The Hough transform extracts lines in the image. From all of the detected lines, the dominant line is chosen (e.g., the longest line) at 386 of both FIGS. 16 and 17. This dominant line may be averaged with neighboring lines that are in the same direction and have a length above a threshold (e.g., 50% of the maximum value from the Hough transform). The resulting line is an estimate of the two-dimensional direction of a contact in the camera image. The two-dimensional directions from the at least two images are used to compute the three-dimensional vector at 388 as an estimate of the contact direction. To compute the three-dimensional vector, the camera(s) capturing the images may require calibration (e.g., the intrinsic and extrinsic camera parameters have to be known or estimated before the insertion). To estimate the three-dimensional vector, two points are chosen on each two-dimensional line. Virtual rays are formed from the camera location through these points in the image plane. For each line, two rays span a plane in three dimensions. The intersection of the two planes (from two cameras) in three-dimensions is the desired estimated three-dimensional direction of the contact in the Cartesian space of the robot end effector.

The process flow of FIG. 17 further illustrates another example of a method of identifying the wire contacts in the two or more images. As shown at 378, the images are acquired and cropped at 380. In an embodiment in which color images of the wire contact and connector are acquired, the image associated with each different color channel of the cameras, such as the red and green color channels may be averaged to create a composite image for subsequent analysis and review. The average of the red and green components of the image are computed at 404, and the image is blurred at 406, and processed in grayscale at 408 ahead of edge detection at 384. This process may be used for various connector types not requiring a gold, silver, or specific color of pixel to be extracted.

FIG. 18 illustrates an example method for correction of automated insertion of a wire contact into a target hole of a connector. As shown at 400, a robot having an end-effector is controlled to align the wire contact with the target hole of the connector. The robot is then controlled to advance the wire contact toward the target hole of the connector and at least partially insert the wire contact into the target hole at 410. The robot ceases insertion at 420 in response to a force between the wire contact and the connector exceeding a predetermined value. A depth of insertion of the wire contact within the target hole is determined at 430, such as by using visual verification through image acquisition devices. A determination is then made at 440 as to whether the depth of insertion is above a minimum depth. If so, the wire contact is considered properly inserted and seated, and a pull test of the wire contact is performed at 450. If the depth is below the minimum, an error condition is identified at 460 using visual feedback. A determination is then made at 470 as to whether too many corrective actions have already been performed on the wire contact. If the number of corrective actions is below a predefined number, an error correction operation is performed at 480. If too many corrective actions have already been performed, the wire contact is moved away from the target hole at 490 for potential manual intervention, a re-setting or re-calibration of the system, or other operation to be performed.

As described above, FIGS. 6, 7, 10, 12-15, 17, and 18 illustrate flowcharts of a system 30, method, and computer program product according to example embodiments of the present disclosure. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 38 of a system 30 employing an embodiment of the present disclosure and executed by the processing circuitry 36 of the system 30. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art having the benefit of the teachings presented in the foregoing descriptions and the associated drawings. Therefore, it is to be understood that the present application is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system for correction of automated insertion of a wire contact into a target hole of a connector, the system comprising:
   a robot having an end-effector, wherein the end-effector comprises a wire gripper;
   a computing device, wherein the computing device is configured to:
      control the robot to align the wire contact with the target hole of the connector;
      control the robot to advance the wire contact toward the target hole of the connector and at least partially insert the wire contact into the target hole;
      control the robot to cease insertion in response to a force between the wire contact and the connector exceeding a predefined value;
      determine a depth of insertion of the wire contact within the target hole of the connector, wherein the depth of insertion of the wire contact into the target hole of the connector is determined based on an initial distance of the wire contact to a surface of the connector and a traveled distance of the robot;
      in response to the depth of insertion being above a predetermined depth, control the robot to perform a pull test of pulling the wire contact away from the connector;
      in response to the depth of insertion being below a predetermined depth:
         identify an error condition using visual feedback;
         determine a number of corrective operations performed;
         perform an error correction operation in response to the number of corrective operations being below a predefined number; and
         move the wire contact away from the target hole in response to the number of corrective operations being above the predefined number.

2. The system of claim 1, wherein the computing device configured to perform an error correction operation comprises the computing device configured to:
   control the robot to adjust an orientation of the wire contact to be oriented perpendicular to a front surface of the connector; and
   control the robot to re-insert the wire contact into the target hole of the connector.

3. The system of claim 2, wherein the computing device configured to adjust the orientation of the wire contact to be oriented perpendicular to the front surface of the connector comprises the computing device configured to:
   determine the orientation of the wire contact relative to the connector;
   project the orientation of the wire contact onto a plane perpendicular to an orientation of the wire gripper to identify a resulting vector; and
   control the robot to adjust the orientation of the wire contact according to the resulting vector to be oriented perpendicular to the front surface of the connector.

4. The system of claim 2, wherein the computing device configured to adjust the orientation of the wire contact to be oriented perpendicular to the front surface of the connector comprises the computing device configured to:
  determine the orientation of the wire contact relative to the connector;
  project the orientation of the wire contact onto a plane perpendicular to an orientation of the wire gripper to identify a resulting vector;
  increase the resulting vector by a predetermined amount; and
  control the robot to adjust the orientation of the wire contact according to the increased resulting vector to be oriented perpendicular to the front surface of the connector.

5. The system of claim 1, wherein the computing device configured to move the wire contact away from the target hole further comprises the computing device configured to:
  control the robot to re-align the wire contact with the target hole;
  control the robot to advance the wire contact toward the target hole of the connector and at least partially insert the wire contact into the target hole;
  control the robot to cease insertion in response to a force between the wire contact and the connector exceeding a predefined value;
  determine a new depth of insertion of the wire contact within the target hole of the connector;
  in response to the new depth of insertion being above a predetermined depth, control the robot to perform a pull test of pulling the wire contact away from the connector; and
  provide for indication of successful insertion of the wire contact into the target hole of the connector in response to the pull test satisfying predetermined criteria.

6. The system of claim 5, wherein the predetermined criteria comprises movement of the wire contact less than a predefined amount out of the target hole in response to a pull force applied to the wire contact of at least a predefined force.

7. The system of claim 1, wherein the end-effector further comprises one or more image acquisition devices for capturing images of the wire contact and the connector from at least two different angles.

8. The system of claim 7, wherein the computing device configured to control the robot to align the wire contact with the target hole of the connector comprises the computing device configured to:
  acquire images from at least two different angles using the one or more image acquisition devices;
  identify a location of the target hole;
  identify an alignment direction to align the wire contact with the target hole of the connector; and
  control the robot to move the wire contact in the alignment direction in a plane orthogonal to an axis along which the wire contact extends.

9. The system of claim 1, wherein the initial distance of the wire contact to the surface of the connector is established using images of the wire contact and the connector from at least two different angles.

10. A method for correction of automated insertion of a wire contact into a target hole of a connector, the method comprising:
  controlling a robot having an end-effector to align the wire contact with the target hole of the connector using a wire gripper of the end-effector;
  controlling the robot to advance the wire contact toward the target hole of the connector and at least partially insert the wire contact into the target hole;
  controlling the robot to cease insertion in response to a force between the wire contact and the connector exceeding a predefined value;
  determining a depth of insertion of the wire contact within the target hole of the connector, wherein the depth of insertion of the wire contact into the target hole of the connector is determined based on an initial distance of the wire contact to a surface of the connector and a traveled distance of the robot;
  in response to the depth of insertion being above a predetermined depth, controlling the robot to perform a pull test of pulling the wire contact away from the connector;
  in response to the depth of insertion being below a predetermined depth:
    identifying an error condition using visual feedback;
    determining a number of corrective operations performed;
    performing an error correction operation in response to the number of corrective operations being below a predefined number; and
    moving the wire contact away from the target hole in response to the number of corrective operations being above the predefined number.

11. The method of claim 10, wherein performing an error correction operation comprises:
  controlling the robot to adjust an orientation of the wire contact to be oriented perpendicular to a front surface of the connector; and
  controlling the robot to re-insert the wire contact into the target hole of the connector.

12. The method of claim 11, wherein adjusting the orientation of the wire contact to be oriented perpendicular to the front surface of the connector comprises:
  determining the orientation of the wire contact relative to the connector;
  projecting the orientation of the wire contact onto a plane perpendicular to an orientation of the wire gripper to identify a resulting vector; and
  controlling the robot to adjust the orientation of the wire contact according to the resulting vector to be oriented perpendicular to the front surface of the connector.

13. The method of claim 11, wherein adjusting the orientation of the wire contact to be oriented perpendicular to the front surface of the connector comprises:
  determining the orientation of the wire contact relative to the connector;
  projecting the orientation of the wire contact onto a plane perpendicular to an orientation of the wire gripper to identify a resulting vector;
  increasing the resulting vector by a predetermined amount; and
  controlling the robot to adjust the orientation of the wire contact according to the increased resulting vector to be oriented perpendicular to the front surface of the connector.

14. The method of claim 10, wherein moving the wire contact away from the target hole further comprises:
  controlling the robot to re-align the wire contact with the target hole;
  controlling the robot to advance the wire contact toward the target hole of the connector and at least partially insert the wire contact into the target hole;

controlling the robot to cease insertion in response to a force between the wire contact and the connector exceeding a predefined value;
determining a new depth of insertion of the wire contact within the target hole of the connector;
in response to the new depth of insertion being above a predetermined depth, controlling the robot to perform a pull test of pulling the wire contact away from the connector; and
providing for indication of successful insertion of the wire contact into the target hole of the connector in response to the pull test satisfying predetermined criteria.

15. An apparatus comprising at least one processor and at least one memory including computer program code, the at least one memory and computer program code configured to, with the processor, cause the apparatus to at least:
control a robot having an end-effector to align a wire contact with a target hole of a connector using a wire gripper of the end-effector;
control the robot to advance the wire contact toward the target hole of the connector and at least partially insert the wire contact into the target hole;
control the robot to cease insertion in response to a force between the wire contact and the connector exceeding a predefined value;
determine a depth of insertion of the wire contact within the target hole of the connector, wherein the depth of insertion of the wire contact into the target hole of the connector is determined based on an initial distance of the wire contact to a surface of the connector and a traveled distance of the robot;
in response to the depth of insertion being above a predetermined depth, control the robot to perform a pull test of pulling the wire contact away from the connector;
in response to the depth of insertion being below a predetermined depth:
identify an error condition using visual feedback;
determine a number of corrective operations performed;
perform an error correction operation in response to the number of corrective operations being below a predefined number; and
move the wire contact away from the target hole in response to the number of corrective operations being above the predefined number.

16. The apparatus of claim 15, wherein causing the apparatus to perform an error correction operation comprises causing the apparatus to:
control the robot to adjust an orientation of the wire contact to be oriented perpendicular to a front surface of the connector; and
control the robot to re-insert the wire contact into the target hole of the connector.

17. The apparatus of claim 16, wherein causing the apparatus to adjust the orientation of the wire contact to be oriented perpendicular to the front surface of the connector comprises causing the apparatus to:
determine the orientation of the wire contact relative to the connector;
project the orientation of the wire contact onto a plane perpendicular to an orientation of the wire gripper to identify a resulting vector; and
control the robot to adjust the orientation of the wire contact according to the resulting vector to be oriented perpendicular to the front surface of the connector.

18. The apparatus of claim 15, wherein causing the apparatus to control the robot to align the wire contact with the target hole of the connector comprises causing the apparatus to:
acquire images from at least two different angles using one or more image acquisition devices;
identify a location of the target hole;
identify an alignment direction to align the wire contact with the target hole of the connector; and
control the robot to move the wire contact in the alignment direction in a plane orthogonal to an axis along which the wire contact extends.

19. The apparatus of claim 15, wherein causing the apparatus to move the wire contact away from the target hole further comprises causing the apparatus to:
control the robot to re-align the wire contact with the target hole;
control the robot to advance the wire contact toward the target hole of the connector and at least partially insert the wire contact into the target hole;
control the robot to cease insertion in response to a force between the wire contact and the connector exceeding a predefined value;
determine a new depth of insertion of the wire contact within the target hole of the connector;
in response to the new depth of insertion being above a predetermined depth, control the robot to perform a pull test of pulling the wire contact away from the connector; and
provide for indication of successful insertion of the wire contact into the target hole of the connector in response to the pull test satisfying predetermined criteria.

* * * * *